US012767274B2

(12) United States Patent
Koide et al.

(10) Patent No.: US 12,767,274 B2
(45) Date of Patent: Oct. 20, 2026

(54) BICYCLE COMPONENT

(71) Applicant: Shimano Inc., Sakai (JP)

(72) Inventors: Tomoki Koide, Osaka (JP); Syoma Nakata, Osaka (JP); Mao Kuroda, Osaka (JP); Keita Michikawa, Osaka (JP); Yuuka Miyanaga, Osaka (JP); Yuji Izuru, Osaka (JP)

(73) Assignee: Shimano Inc., Osaka (JP)

( * ) Notice: Subject to any disclaimer, the term of this patent is extended or adjusted under 35 U.S.C. 154(b) by 406 days.

(21) Appl. No.: 18/396,527

(22) Filed: Dec. 26, 2023

(65) Prior Publication Data

US 2025/0206411 A1 Jun. 26, 2025

(51) Int. Cl.
*B62M 25/08* (2006.01)
*B62J 45/421* (2020.01)

(52) U.S. Cl.
CPC ............ *B62M 25/08* (2013.01); *B62J 45/421* (2020.02)

(58) Field of Classification Search
CPC ......... H04W 4/40; H04W 4/80; H04W 76/10; H04W 76/11; H04W 76/19; H04B 5/00; H04B 5/20; B62M 25/00; B62M 25/08; B62M 6/00; B62M 6/10; B62M 6/20; B62M 6/40; B62M 6/55; B62J 45/00; B62J 45/42; B62J 45/421; G08C 17/02
See application file for complete search history.

(56) References Cited

U.S. PATENT DOCUMENTS 11,338,876 B2 * 5/2022 Nelson ..................... B62J 45/42
11,451,444 B2 * 9/2022 Chuang .................. B62M 25/08
11,703,118 B2 * 7/2023 Wesling ................. B62M 25/08 701/51
2016/0100280 A1 * 4/2016 Wright .................... H04W 4/80 455/41.2
2018/0009508 A1 1/2018 Suzuki et al.
2020/0170060 A1 5/2020 Inoue et al.

FOREIGN PATENT DOCUMENTS

CN 108116615 A * 6/2018 .............. B62M 6/90
CN 108622267 A * 10/2018 .............. B62J 45/40

OTHER PUBLICATIONS

Chen, CN 108622267 A, "Intelligent Type Bicycle Device", Oct. 9, 2018, (English Text) (Year: 2018).*
Sato et al., CN 108116615 A, "Control Method of Electronic Device and Electronic Device", Jun. 5, 2018 (English Text) (Year: 2018).*

* cited by examiner

*Primary Examiner* — Quochien B Vuong
(74) *Attorney, Agent, or Firm* — Spencer Fane, LLP

(57) ABSTRACT

A bicycle component is basically provided with a processor and a wireless communicator. The wireless communicator is electrically connected to the processor. The wireless communicator is configured to wirelessly send a signal. The signal selectively includes a first signal and a second signal. The first signal corresponds to a first app. The second signal corresponds to a second app. The wireless communicator is configured to send the second signal in response to receipt of an instruction from a remote communication device.

20 Claims, 8 Drawing Sheets

BICYCLE COMPONENT

BACKGROUND

Technical Field

This disclosure generally relates to a bicycle component, a system including a bicycle component and a remote communication device including the first app and the second app, a non-transitory computer-readable storage medium for a bicycle component and a non-transitory computer-readable storage mediums for a remote communication device.

Background Information

In recent years, some human powered vehicles such as bicycles are provided with electric bicycle components or devices to make it easier for the rider to operate the human powered vehicle. Some of these bicycles are provided with a bicycle wireless system in which bicycle components wirelessly communicate with each other. Examples of some these electric bicycle components include suspensions, transmission devices (e.g., derailleurs, internally geared hubs, etc.) and seatposts.

SUMMARY

Generally, the present disclosure is directed to various features of a bicycle component a bicycle component that communicates wirelessly with a remote communication device, a system including a bicycle component that communicates wirelessly with a remote communication device, a non-transitory computer-readable storage medium for a bicycle component communicates wirelessly with a remote communication device and a non-transitory computer-readable storage mediums for a remote communication device that communicates wirelessly with a bicycle component.

In view of the state of the known technology and in accordance with a first aspect of the present disclosure, a bicycle component is provided that basically comprises a processor and a wireless communicator. The wireless communicator is electrically connected to the processor. The wireless communicator is configured to wirelessly send a signal. The signal selectively includes a first signal and a second signal. The first signal corresponds to a first app. The second signal corresponds to a second app. The wireless communicator is configured to send the second signal in response to receipt of an instruction from a remote communication device.

With the bicycle component according to the first aspect, it is possible for a user to easily switch between the first app and the second app.

In accordance with a second aspect of the present disclosure, the bicycle component according to the first aspect is configured so that the first app is installed in the remote communication device. The first signal includes a first connection signal for using the first app in connection with the bicycle component. The wireless communicator is configured to establish a wireless connection between the wireless communicator and the remote communication device using the first connection signal.

With the bicycle component according to the second aspect, wireless communication between the bicycle component and the first app can be easily and securely established.

In accordance with a third aspect of the present disclosure, the bicycle component according to the second aspect is configured so that the first connection signal includes identification information of the bicycle component.

With the bicycle component according to the third aspect, a secure wireless communication can be easily established between the bicycle component and the first app.

In accordance with a fourth aspect of the present disclosure, the bicycle component according to the second aspect or the third aspect is configured so that the instruction is sent from the remote communication device in a state where the wireless communication is established.

With the bicycle component according to the fourth aspect, the remote communication device can securely communication with the bicycle component.

In accordance with a fifth aspect of the present disclosure, the bicycle component according to any one of the second aspect to the fourth aspect is configured so that the first signal includes a first data signal. The wireless communicator is configured to send the first data signal in a state where the wireless connection is established using the first connection signal. The first data signal includes first information related to a bicycle.

With the bicycle component according to the fifth aspect, first information related to the bicycle can be provided to the first app via the first data signal.

In accordance with a sixth aspect of the present disclosure, the bicycle component according to any one of the second aspect to the fifth aspect further comprises a storage device configured to store a pairing information related to pairing with the remote communication device. The processor is configured to conduct a pairing process with the remote communication device in response to receipt of the instruction in a case where the storage device does not store the pairing information.

With the bicycle component according to the sixth aspect, the remote communication device and the bicycle component can wirelessly communicate without having to pair each time a wireless connection is established.

In accordance with a seventh aspect of the present disclosure, the bicycle component according to any one of the second aspect to the sixth aspect is configured so that the processor is configured to execute a prohibition process prohibiting reconnection with the remote communication device for a predetermined time after disconnecting from the remote communication device.

With the bicycle component according to the seventh aspect, the bicycle component can be completely disconnected from the remote communication device before reconnecting.

In accordance with an eighth aspect of the present disclosure, the bicycle component according to the seventh aspect is configured so that the processor is configured not to execute the prohibition process in a case where the processor receives the instruction from the remote communication device.

With the bicycle component according to the eighth aspect, it is possible for a user to override the prohibition process if the user wants to connect to a different device from the remote communication device.

In accordance with a ninth aspect of the present disclosure, the bicycle component according to any one of the second aspect to the eighth aspect is configured so that the second app is installed in the remote communication device. The second signal includes a second connection signal for using the second app in connection with the bicycle component. The wireless communicator is configured to establish the wireless connection using the second connection signal. The wireless communicator is configured to disconnect from the remote communication device prior to connecting with the remote communication device using the second connection signal in a state where the wireless communicator has established the wireless connection with the remote communication device using the first connection signal.

With the bicycle component according to the ninth aspect, it is possible for a user to use a single remote communication device to switch between the first app and the second app.

In accordance with a tenth aspect of the present disclosure, the bicycle component according to the ninth aspect is configured so that the second signal includes a second data signal. The wireless communicator is configured to send the second data signal in a state where the wireless connection is established using the second connection signal. The second data signal includes second information related to a bicycle.

With the bicycle component according to the tenth aspect, second information related to the bicycle can be provided to the second app via the second data signal.

In accordance with an eleventh aspect of the present disclosure, the bicycle component according to any one of the first aspect to the eighth aspect is configured so that the second app is installed in the remote communication device. The second signal includes a second connection signal for using the second app in connection with the bicycle component. The wireless communicator is wirelessly connected with the remote communication device using the second connection signal.

With the bicycle component according to the eleventh aspect, wireless communication between the bicycle component and the second app can be easily and securely established.

In accordance with a twelfth aspect of the present disclosure, the bicycle component according to any one of the ninth aspect to the eleventh aspect is configured so that the second connection signal includes identification information of the bicycle component.

With the bicycle component according to the twelfth aspect, a secure wireless communication can be easily established between the bicycle component and the second app.

In accordance with a thirteenth aspect of the present disclosure, the bicycle component according to any one of the first aspect to the twelfth aspect is configured so that the remote communication device is configured to generate the instruction in response to receipt of a user operation to the remote communication device.

With the bicycle component according to the thirteenth aspect, it is possible to easily switch between the first app and the second app in response to receipt of a user operation to the remote communication device.

In accordance with a fourteenth aspect of the present disclosure, the bicycle component according to any one of the first aspect to the thirteenth aspect is configured so that the wireless communicator is configured to send the first signal in response to receipt of the instruction where the user operation is associated with using the first app on the remote communication device in connection with the bicycle component. The wireless communicator is configured to send the second signal in response to receipt of the instruction where the user operation is associated with using the second app in connection with the bicycle component.

With the bicycle component according to the fourteenth aspect, it is possible to easily switch wireless communication of the bicycle component from one of the first app and the second app to the other of the first app and the second app while in either of the first app or the second app. Thus, the user can input a user operation while in either of the first app or the second app to disconnect the wireless communication between the bicycle component and the remote communication device, and then reconnect the wireless communication between the bicycle component and the other one of the first app or the second app.

In accordance with a fifteenth aspect of the present disclosure, the bicycle component according to any one of the first aspect to the fourteenth aspect is configured so that the wireless communicator is configured to change the signal from the first signal to the second signal in response to receipt of the instruction in a state where the wireless communicator has established the wireless connection with the remote communication device using the first connection signal.

With the bicycle component according to the fifteenth aspect, it is possible to easily switch wireless communication of the bicycle component from the first app to the second app.

In accordance with a sixteenth aspect of the present disclosure, the bicycle component according to any one of the first aspect to the fifteenth aspect is configured so that the bicycle component includes a transmission device.

With the bicycle component according to the sixteenth aspect, information related to a transmission device of the bicycle can be provided to the user via a remote communication device.

In accordance with a seventeenth aspect of the present disclosure, the bicycle component according to any one of the first aspect to the sixteenth aspect is configured so that the bicycle component includes a sensor.

With the bicycle component according to the seventeenth aspect, traveling information or performance information detected by a sensor of the bicycle can be provided to the user via the remote communication device.

In accordance with an eighteenth aspect of the present disclosure, a system is provided comprising the bicycle component according any one of the first aspect to the seventeenth aspect, and further comprises the remote communication device including the first app and the second app.

With the system according to the eighteenth aspect, a single remote communication device can include the first app and the second app so that the remote communication device including the first app and the second app.

In accordance with a nineteenth aspect of the present disclosure, a non-transitory computer-readable storage medium is provided for storing program instructions thereon. The program instructions are executable by a processor of a bicycle component. The processor is electrically connected to a wireless communicator of the bicycle component. The program instructions are configured to: cause the wireless communicator to wirelessly send a first signal corresponding to a first app; and cause a wireless communicator to wirelessly send a second signal corresponding to a second app in response to receipt of an instruction from a remote communication device.

With the non-transitory computer-readable storage medium according to the nineteenth aspect, the bicycle component can be easily programmed to wirelessly communicate with a first app and a second app.

In accordance with a twentieth aspect of the present disclosure, a non-transitory computer-readable storage medium is provided for storing remote program instructions thereon. The remote program instructions are executable by a remote processor of a remote communication device. The remote processor is electrically connected to a remote wireless communicator of the remote communication device. The remote wireless communicator is configured to wirelessly communicate with a wireless communicator of a bicycle component. The wireless communicator is configured to wirelessly send a first signal corresponding to a first app and is configured to wirelessly send a second signal corresponding to a second app. The remote program instructions are configured to: cause the external wireless communicator to wirelessly send an instruction to the wireless communicator. The instruction from the remote wireless communicator is configured to instruct a processor of the bicycle component to cause the wireless communicator to send the second signal.

With the non-transitory computer-readable storage medium according to the twentieth aspect, the remote communication device can be easily programmed to wirelessly communicate with the bicycle component for receiving signals with respect to a first app and a second app.

Also, other objects, features, aspects and advantages of the disclosed bicycle component, the system and the disclosed non-transitory computer-readable storage medium will become apparent to those skilled in the art from the following detailed description, which, taken in conjunction with the annexed drawings, discloses preferred embodiments of the bicycle component.

BRIEF DESCRIPTION OF THE DRAWINGS

Referring now to the attached drawings which form a part of this original disclosure, selected embodiments are illustrated.

DETAILED DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
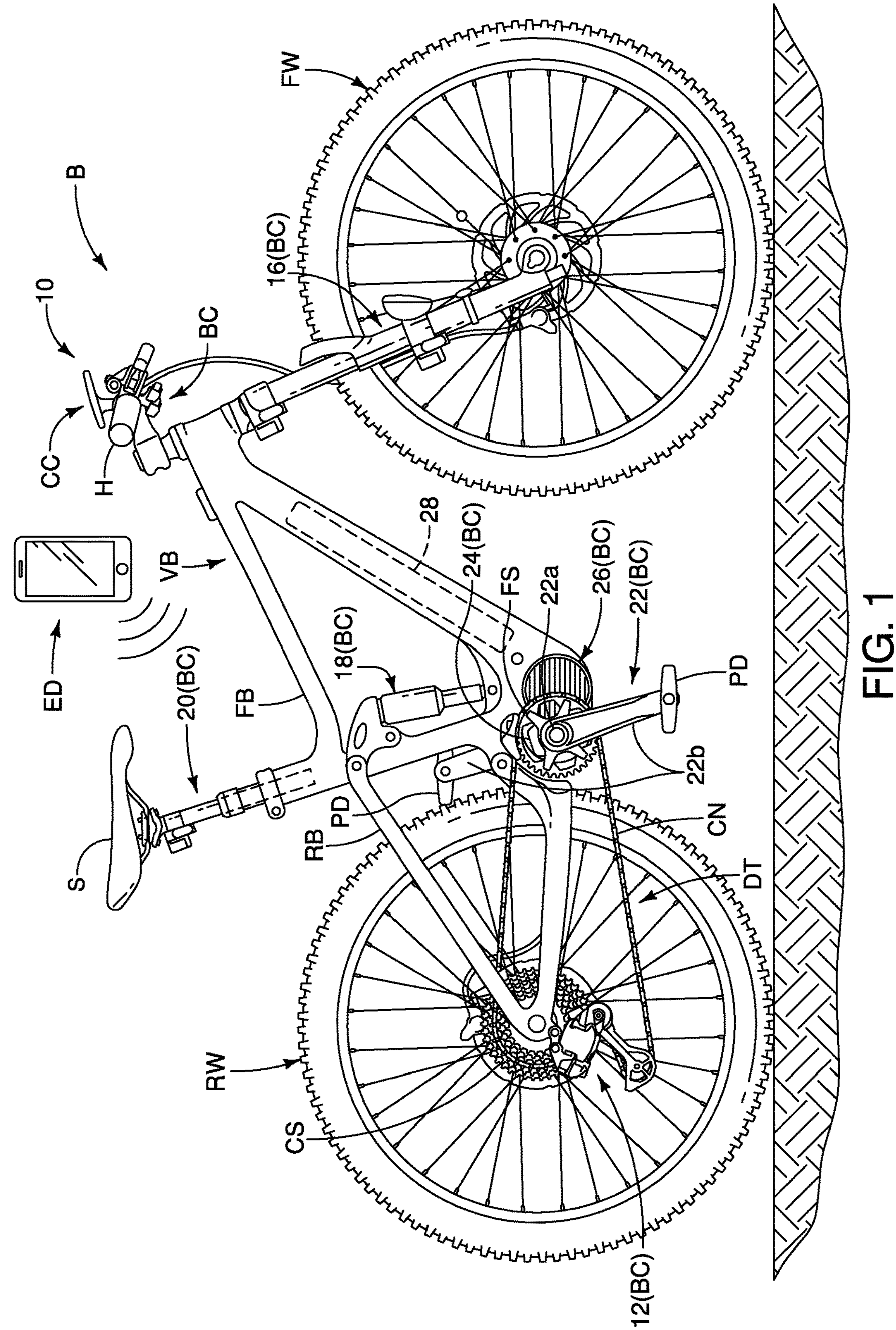
FIG. 1 is a side elevational view of a bicycle that is equipped with a plurality of bicycle components (e.g., a rear derailleur, a front suspension, a rear suspension, an adjustable seatpost, a crank arm, a power meter, a drive unit, etc.) in accordance with illustrated embodiments of the present disclosure.

Referring initially to FIG. 1, a bicycle B is illustrated that is equipped with a system 10 in accordance with illustrated embodiments. Here, in the first embodiment, the system 10 basically includes at least one bicycle component BC and a remote communication device ED. In a second embodiment, the system 10 basically includes at least one bicycle component BC, the remote communication device ED and a cycle computer CC. While FIG. 1 illustrates the remote communication device ED as a smartphone that is not mounted to the bicycle B, it will be apparent from this disclosure that the remote communication device ED can be mounted to the bicycle B. In the case of the first embodiment, the cycle computer CC can be omitted and the remote communication device ED can be mounted to the bicycle B in place of the cycle computer CC. Also, while the remote communication device ED is preferably a smartphone as shown, the remote communication device ED can be some other mobile device such as a smart watch, wireless headphones, a tablet, a laptop, etc.

Here, the cycle computer CC can also be referred to as a first remote communication device, and the remote communication device ED can be referred to as a second remote communication device. The term "remote" as used herein to refer a device or an app (software application) that is physically separated from the bicycle component BC. Here, the remote communication device ED can also be referred to as an external device other than a cycle computer.

In the first embodiment, as explained below, the remote communication device ED includes two apps (software application) for wireless communicating with one or more of the bicycle components BC. On the other hand, in the second embodiment, the cycle computer CC includes a first app configured to wirelessly communicate with one or more of the bicycle components BC and the remote communication device ED includes a second app configured to wirelessly communicate with one or more of the bicycle components BC. Here, the remote communication device ED has one or more primary functions such as a telephone function, a message function, a web browsing function, etc., and a secondary function of the first app and/or the second app. In other words, the remote communication device ED has at least one primary function other than the secondary function relating to the bicycle. The term "bicycle component BC" as used herein generically refers to all of the bicycle components of the bicycle B that are configured to wirelessly communicate with the remote communication device ED and/or the cycle computer CC. The components or parts of the bicycle B that cannot wirelessly communicate will not be referred to as "bicycle component BC" herein.

The first app and the second app are configured to display or otherwise notify the user of information related to the bicycle B. The first app is different from the second app. For example, the first app displays real time data regarding the bicycle B such as various operational conditions of the bicycle component BC and other operational conditions of the bicycle such as GPS, bicycle speed, cadence, pedaling force, etc., while the second app provides maintenance, software updating, diagnostics, adjustments to settings, etc. for the bicycle component BC. In any case, the first app and the second app are both configured to receive data from the bicycle component BC and process the data from the bicycle component BC. The first app and the second app cannot be simultaneously connected to the same bicycle component BC. To switch between the first app and the second app, the currently running app needs to be disconnected from the bicycle component BC before the other app can be connected to the bicycle component BC. In other words, the wireless communication between the bicycle component BC and either the remote communication device ED or the cycle computer CC needs to be disconnected when switching between the first app and the second app.

In FIG. 1, the bicycle B is illustrated as an e-bike that uses a driving force of an electric motor in addition to a human driving force for propulsion. However, the system 10 can be applied to any other type of bicycles such as, for example, a mountain bike, a cyclocross bicycle, a gravel bike, a city bike, a cargo bike, and a recumbent bike. The bicycle B is equipped with a plurality of bicycle component BC. Basically, in the system 10, the remote communication device ED and the cycle computer CC are configured to wirelessly communicate with the bicycle components BC. However, the bicycle components BC cannot wirelessly communicate with the remote communication device ED and the cycle computer CC in a simultaneous manner. Also, in the case of the first embodiment, the bicycle components BC cannot wirelessly communicate with the two apps of the remote communication device ED in a simultaneous manner.

As shown in FIG. 1, the bicycle B includes a vehicle body VB that is supported by a rear wheel RW and a front wheel FW. The vehicle body VB basically includes a front frame body FB and a rear frame body RB (a swing arm). The rear derailleur 12 is mounted to the rear frame body RB in a conventional manner. The vehicle body VB is also provided with a handlebar H. An operating device 14 is preferably configured to be mounted to the handlebar H in a conventional manner. For example, the operating device 14 is mounted to the right side of the handlebar H adjacent to an inner end of the right hand grip. The rear derailleur 12 (i.e., a bicycle component BC) is configured to shift the chain CN between the rear sprockets CS in response to either an automatic shift signal from the cycle computer CC, or a user inputted shift signal from the first operating device 14 (i.e., a bicycle component BC).

Here, the bicycle B further includes a front suspension fork 16 (i.e., a bicycle component BC) and a rear shock absorber 18 (i.e., a bicycle component BC). The front suspension fork 16 is pivotally coupled at its upper end to the front frame body FB, and rotatably supports the front wheel FW at its lower end. The rear frame body RB is swingably mounted to a rear section of the front frame body FB such that the rear frame body RB can pivot with respect to the front frame body FB. The rear wheel RW is mounted to a rear end of the rear frame body RB. The rear shock absorber 18 is operatively disposed between the front frame body FB and rear frame body RB. The rear shock absorber 18 is provided between the front frame body FB and the rear frame body RB to control the movement of the rear frame body RB with respect to the front frame body FB. Namely, the rear shock absorber 18 absorbs shock transmitted from the rear wheel RW. Here, the bicycle B includes the adjustable seatpost 20 is mounted to a seat tube of the front frame body FB in a conventional manner and supports the bicycle seat or saddle S in any suitable manner.

The bicycle B further includes a drivetrain DT. Here, for example, the drivetrain DT is a chain-drive type that includes a crank 22, at least one front sprocket FS, a plurality of rear sprockets CS and a chain CN. The crank 22 includes a crank axle 22*a* and a pair of crank arms 22*b*. The crank axle 22*a* is rotatably supported to the front frame body FB via the electric assist unit E. The crank arms 22*b* are provided on opposite ends of the crank axle 22*a*. A pedal PD is rotatably coupled to the distal end of each of the crank arms 22*b*. While the drivetrain DT is illustrated as a chain-drive type of drivetrain, the drivetrain DT can be selected from any type of drivetrain, and can be a belt-drive type or a shaft-drive type. The front sprocket FS is provided on the crank 22 to rotate integrally with the crank axle 22*a*. The rear sprockets CS are provided on a hub of the rear wheel RW. The chain CN runs around the front sprocket FS and the rear sprockets CS. A human driving force is applied to the pedals PD by a rider such that the driving force is transmitted via the front sprocket FS, the chain CN and the rear sprockets CS to the rear wheel RW.

Figure 2:
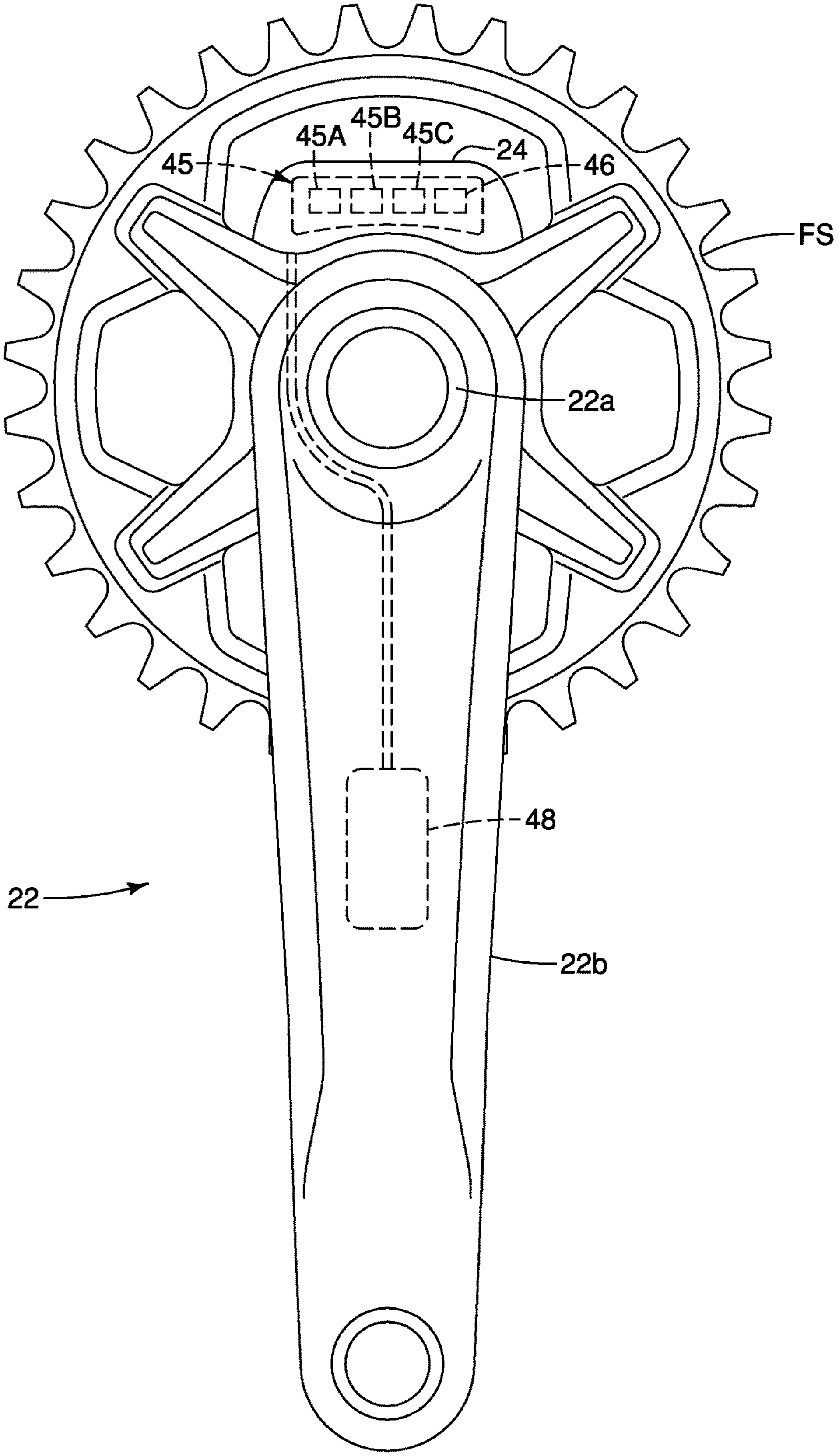
FIG. 2 is a side elevational view of the crank arm (i.e., a bicycle component) having the power meter (i.e., a bicycle component) of the bicycle illustrated in FIG. 1.

Here, as seen in FIG. 2, one of the crank arms 22*b* is provided with a power meter 24 (i.e., a bicycle component BC). The power meter 24 is configured to calculate a pedaling force applied to one or both of the crank arms 22*b*. The power meter 24 can be a separate device from the crank 22, or can be integrated with the crank 22. The power meter 24 will be discussed in further detail below.

Referring back to FIG. 1, the bicycle B further includes a drive unit 26 as a bicycle component BC. Basically, the drive unit 26 includes an electric motor that is configured to apply a propulsion force to the bicycle B. Here, the crank axle 22*a* is integrated into the drive unit 22. The crank axle 22*a* is operatively connected to the electric motor of the drive unit 26 such that the crank axle 22*a* is rotated by the electric motor of the drive unit 26. Since drive units that assist in the propulsion force of a bicycle are well known in the bicycle, the drive unit 26 will not be discussed in further detail.

As seen in FIG. 1, the bicycle B further includes an electrical power supply 28. Here, the electrical power supply 28 is a battery pack that includes one or more batteries. Here, for example, the power supply 28 is located in the downtube of the bicycle frame. Alternatively, the power supply 28 can be attached an outer surface of the bicycle frame. The electrical power supply 28 preferably includes one or more rechargeable batteries. The electrical power supply 28 is configured to supply electrical power to the drive unit 22 and the rear derailleur 12. In particular, as seen in FIG. 1, the drive unit 22 is electrically connected to the electrical power supply 28. The rear derailleur 12 is electrically connected to an electrical junction of the drive unit 22. In other words, here, the rear derailleur 12 receives electrical power from the power supply 28 via the drive unit 22. Alternatively, the rear derailleur 12 can be directly connected to the power supply 28 to receive the electrical power directly from the power supply 28. When the drive unit 22 is in the off mode, the electrical power from the power supply 28 is disconnected from the rear derailleur 12. Thus, when the drive unit 22 is turned on, the electrical power from the power supply 28 is supplied to the rear derailleur 12.

Figure 4:
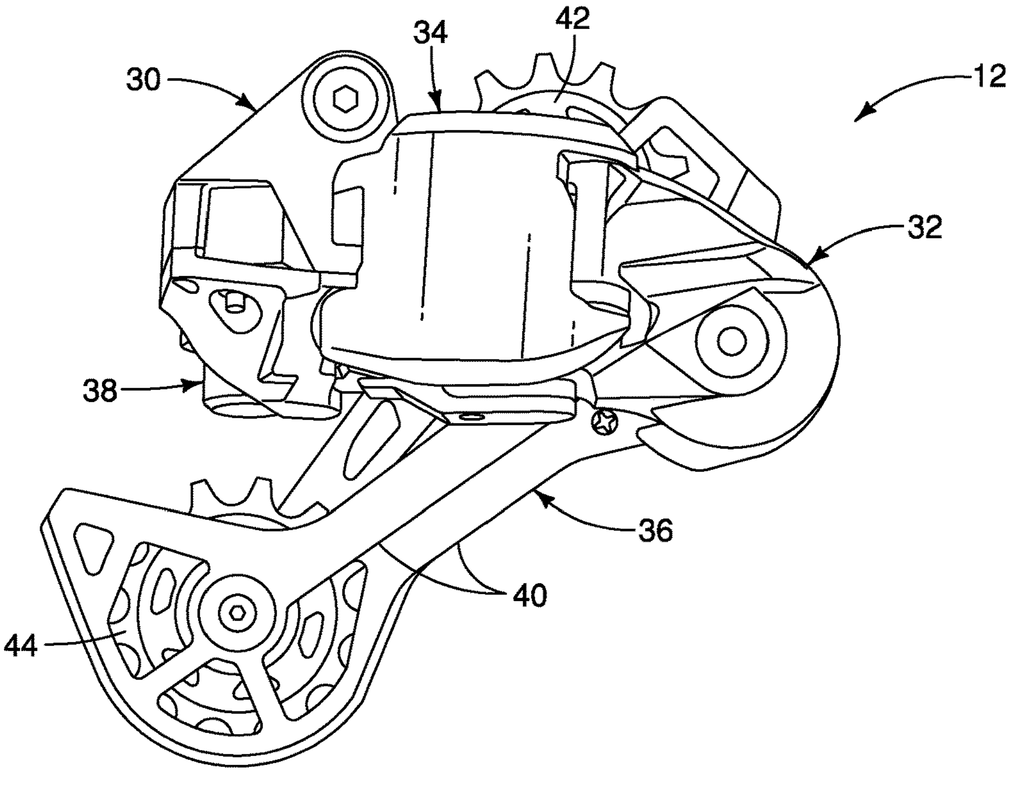
FIG. 4 is a side elevational view of the rear derailleur (i.e., a bicycle component) of the bicycle illustrated in FIG. 1.

Referring now to FIG. 4, basically, the rear derailleur 12 comprises a base member 30, a movable member 32, and a linkage structure 34. The rear derailleur 12 is one example of a transmission device. Thus, in the system 10, the bicycle component BC includes a transmission device. The linkage structure 34 is configured to movably connect the movable member 32 relative to the base member 30. In particular, the base member 30 is mounted to the rear frame body RB, and the linkage structure 34 movably connects the movable member 32 to the base member 30. In this way, the movable member 32 can be moved in a lateral direction of the bicycle B relative to the base member 30. Here, the rear derailleur 12 further comprises a chain guide 36. The chain guide 36 is configured to pivotally coupled to the movable member 32 about a pivot axis P1. The chain guide 36 is configured to move the chain CN between a plurality of sprockets of a sprocket assembly for changing the shift (gear) stage. The chain guide 36 is configured to contact the chain CN to shift the chain CN between the rear sprockets CS as the movable member 32 moves in the lateral direction of the bicycle B relative to the base member 30.

The rear derailleur 12 further comprises an actuator 38 that is provided to one of the base member 30, the linkage structure 34 and the linkage structure 34. In the illustrated embodiment, the actuator 38 is provided to the base member 30. However, the actuator 38 can be provided to either the linkage structure 34 or the linkage structure 34 as needed and/or desired. In any case, the actuator 38 is operatively coupled to the linkage structure 34. In other words, the actuator 38 is operatively coupled to the linkage structure 34 to move the linkage structure 34 with respect to the base member 30 in response to a shift command. Here, the actuator 38 is an electric motor. Thus, in the illustrated embodiment, the rear derailleur 12 constitutes an electric rear derailleur. Preferably, as seen in FIG. 4, the chain guide 36 basically includes a pair of chain cage plates 40, a guide pulley 42 and a tension pulley 44. The guide pulley 42 and the tension pulley 44 are both rotatably disposed between the chain cage plates 40. Since rear derailleurs such as the rear derailleur 12 are well known in the bicycle field, the rear derailleur 12 will only be discussed to the extent needed to understand the system 10.

As mentioned above, the rear derailleur 12, the operating device 14, the front suspension fork 16, the rear shock absorber 18, the adjustable seatpost 20, the crank 22 having the power meter 24 and the drive unit 26 are examples of bicycle components BC that wirelessly communicate with the cycle computer CC and the remote communication device ED. The bicycle B of FIG. 1 does not include a front derailleur and an internal transmission. Alternatively, the cycle computer CC and the remote communication device ED can also be used with a bicycle having a front derailleur and/or an internal transmission as bicycle components BC that wirelessly communicate with the cycle computer CC and the remote communication device ED. All of these bicycle components BC wirelessly send first information to a first app that is provided to either the cycle computer CC or the remote communication device ED, or to both the cycle computer CC and the remote communication device ED. Also, all of these bicycle components BC wirelessly receive second information from a second app that is provided to the remote communication device ED. Of course, it will be apparent from this disclosure that only one of the bicycle components BC can be configured to wirelessly communicate with the cycle computer CC and the remote communication device ED. In other words, one or more of the bicycle components BC can be configured to wirelessly communicate with the cycle computer CC and the remote communication device ED as needed and/or desired. Generally speaking, in the case of the first embodiment, the system 10 comprises the bicycle component BC and further comprises the remote communication device ED, where the remote communication device ED includes the first app and the second app. In other words, in the first embodiment, the first app is installed in the remote communication device ED. Also, in the first embodiment, the second app is installed in the remote communication device ED.

In the case of the first app, the bicycle components BC send a first data signal includes first information related to a bicycle. In the first embodiment, the first information related to the bicycle is sent to the first app, which is installed in the remote communication device ED. For example, the first information includes, among other things, at least one (1) first transmission information, (2) first traveling information, and (3) first other device information. Typically, the first information of the first data signal relates to the particular information related to the bicycle component sending the first data signal.

The first transmission information includes, for example, at least one of a shifting mode, a gear-shift interval, a gear position, adjust information, and a combination of sprockets. Here, the term "shifting mode" refers to a current shifting mode such as a synchronized shifting mode, an auto shift mode and a normal shifting mode. Here, the term "gear position" include a current gear position and a maximum gear position such as for example 8, 10, 11, 12 or 13 in the case of a rear derailleur, and 1, 2 or 3 in the case of a front derailleur. Here, the term "adjust information" refers to an adjust value for a transmission device (e.g., a rear derailleur, a front derailleur, an internally geared hub). Preferably, the adjust values can be set by the user in an adjustment mode. Depending on the values, the positions of transmission devices (e.g., a rear derailleur, a front derailleur, an internally geared hub) are changed. Here, the term "combination of sprockets" refers to the number of teeth of each sprocket. The traveling information includes, for example, at least one of a running state, torque information, speed information, cadence information, a traveling time and a traveling distance. The other device information includes, for example, at least one of an assist mode of the drive unit, a position of the suspension and a position of the adjustable seatpost.

In the case of the second app, the bicycle components BC send a second data signal includes second information related to the bicycle 10. In the first embodiment, the second information related to the bicycle is sent to the second app, which is installed in the remote communication device ED. For example, the first information includes, among other things, at least one (1) second transmission information, (2) second traveling information, (3) second other device information, and (4) identification information. Typically, the first information of the second data signal relates to the particular information related to the bicycle component sending the second data signal. The second transmission information, the second traveling information and the second other device information can be the same as the first transmission information, the first traveling information and the first other device information, respectively. Alternatively, the second transmission information, the second traveling information and the second other device information can be different from the first transmission information, the first traveling information and the first other device information, respectively.

The second transmission information can include, for example background information such as interval of multiple shifting. Typically, the background information is not shown on the user interface of the remote communication device ED (e.g., a smartphone). The second traveling information can be omitted as a modification. The second other device information can include, for example, an assignment of button of the shift device. The identification information can include, for example, a serial number of the bicycle component, a model number of the bicycle component, and the firmware version of the bicycle component.

For the sake of brevity, only the communication of selected bicycle components BC (i.e., the rear derailleur 12 and the crank 22) will be discussed in further detail with respect to the system 10. Basically, in the system 10, the bicycle component BC comprises a processor and a wireless communicator. Also, preferably, the bicycle component BC further comprises a storage device. The storage device is configured to store a pairing information related to pairing with the remote communication device ED. By way of examples, the rear derailleur 12 and the crank 22 will be discussed as examples of bicycle component BC in the system 10.

Figure 3:
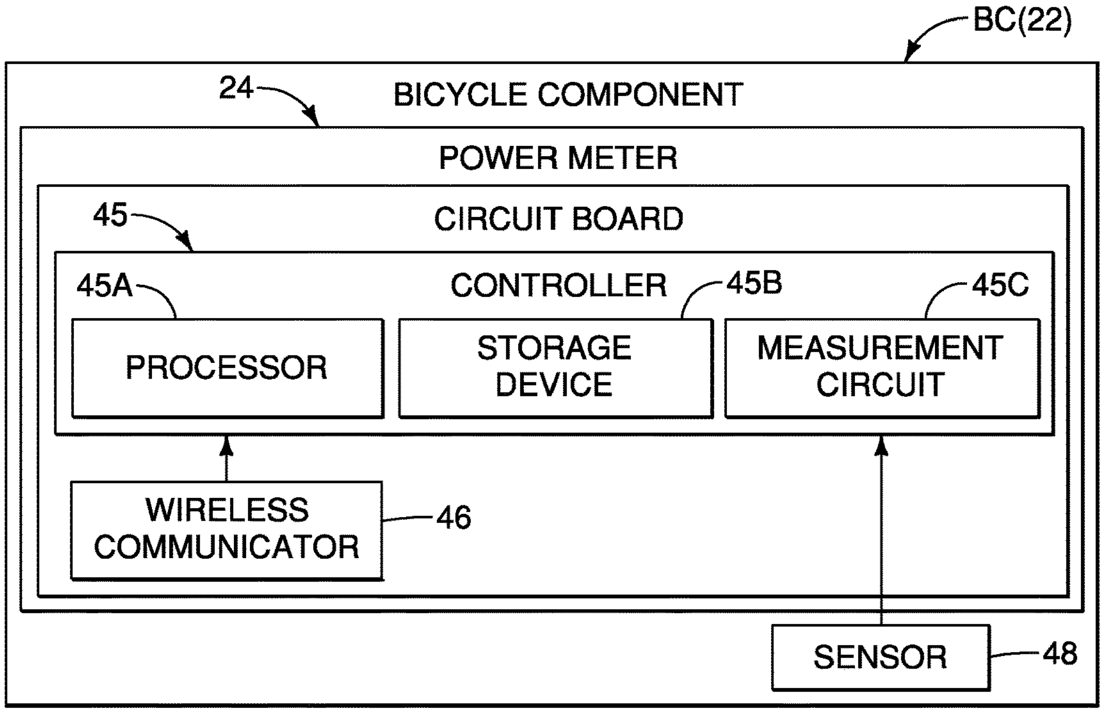
FIG. 3 is a schematic block diagram of the crank arm having the power meter in accordance with illustrated embodiments of the present disclosure.
Figure 6:
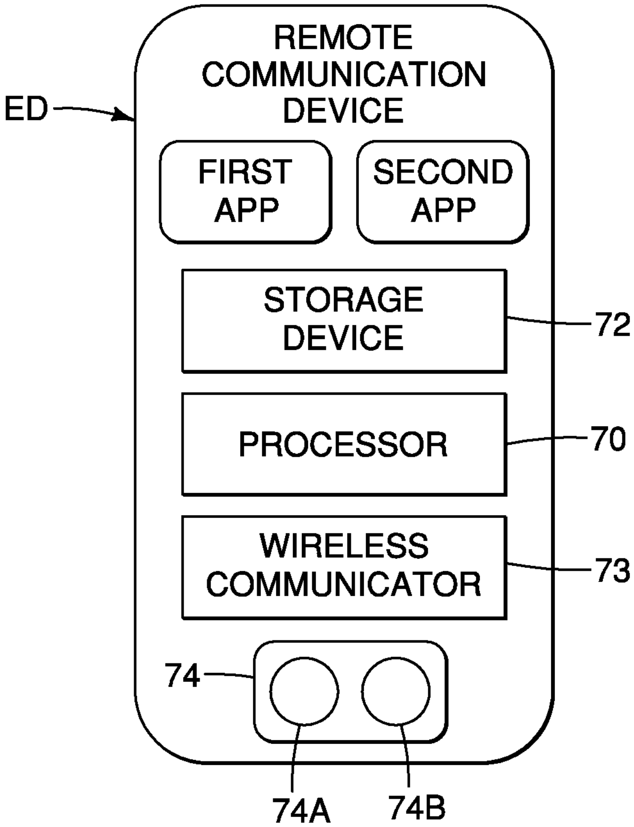
FIG. 6 is a schematic block diagram of a remote communication device configured to wirelessly communicate with one or more of the bicycle components (e.g., the rear derailleur and/or the power meter) of the bicycle illustrated in FIG. 1.

Turning now FIGS. 2, 3 and 6, the crank 22 includes the power meter 24, and is configured to wirelessly communicate with the remote communication device ED (FIG. 6), which includes the first app and the second app. In particular, the crank 22 comprises a controller 45 and a wireless communicator 46. Here, for example, the controller 45 and the wireless communicator 46 are provided on a circuit board 52. Also, here, the crank 22 includes a sensor 48 that is configured to measure a rotational or pedaling force applied to the crank arm 22*b*. Thus, in the system 10, the bicycle component BC includes a sensor. Here, the controller 45 and the wireless communicator 46 are provided in a housing of the power meter 24, while the sensor 48 is applied to one of the crank arm 22*b*. Since power meters such as the power meter 24 are well known in the bicycle field. Thus, the power meter 24 will only be briefly discussed herein.

Preferably, the controller 45 comprises at least one processor 45A. Also, preferably, the controller 45 comprises at least one storage device 45B (i.e., a computer memory device). Alternatively, the storage device 45B can be provided separately from the controller 45. Here, the controller 45 further comprises a measurement circuit 45C that is configured to calculate a rotational or pedaling force applied to the crank arm 22*b*. Thus, the crank 22 is an example of a bicycle component BC comprising a processor 45A and a wireless communicator 46. Also, the crank 22 is an example of the bicycle component BC further comprising a storage device 45B. The storage device 45B is configured to store a pairing information related to pairing with the remote communication device ED.

In particular, one or both of the crank arms 22*b* are provided with the sensor 48. as mentioned above, the sensor 48 is configured to measure a rotational or pedaling force applied to the crank arm 22*b*. The terms "sensor" and "detector" as used herein refer to a hardware device or instrument designed to detect the presence or absence of a particular event, object, substance, or a change in its environment, and to emit a signal in response. The terms "sensor" and "detector" as used herein do not include a human being. For example, as in the illustrated embodiments, the sensor 48 can include a strain sensor, a magnetostrictive sensor, a pressure sensor, or the like. Preferably, the sensor 48 includes one or more strain gauges provided on a substrate that is attached by adhesive to a portion of the crank arm 22*b*. The force sensors are conventional sensors that are well known in the bicycle field. Thus, the sensor 48 will only be briefly discussed herein.

The sensor 48 is configured to output a change in electrical resistance depending on the deformation amount of the crank arm 22*b*. In other words, the sensor 48 is configured to output the change in the electrical resistance depending on the deformation amount of the crank arm 22*b* occurring due to pedaling. The measurement circuit 45C is electrically connected to the sensor 48 to convert the output of the force sensor 48 to a voltage indicating the deformation amount of the crank arm 22*b*. For example, the measurement circuit 45C constitutes a bridge circuit with the sensor 48. The measurement circuit 45C is connected to the sensor 48 by a flexible printed wiring board. The wireless communicator 46 can then send the calculated pedaling force and/or cadence to the remote communication device ED.

Referring to FIG. 3, the controller 45 can be a microprocessor or central processing unit (CPU) that includes the processor 45A and the storage device 45B. The controller 45 is formed of one or more semiconductor chips that are mounted on the circuit board. The terms "electronic controller" or "controller" as used herein refers to hardware that executes a software program, and does not include a human being.

The storage device 45B is any computer storage device or any non-transitory computer-readable medium with the sole exception of a transitory, propagating signal. For example, the storage device 45B is connected to the processor 45A. The storage device 45B stores, for example, control programs and information used for control processes. The storage device 45B includes, for example, a non-volatile memory and a volatile memory. The non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM). Thus, the storage device 45B includes a non-transitory computer-readable storage medium that is provided for storing program instructions thereon. In particular, the storage device 45B has stored a wireless communication program for wirelessly communicating with the remote communication device ED and the cycle computer CC. The storage device 45B has stored a data providing program for providing data to the remote communication device ED and the cycle computer CC. The storage device 45B has stored a pairing program for pairing with the remote communication device ED and the cycle computer CC. The storage device 45B also has stored various identification information of the crank 22 and the power meter 24.

Basically, the wireless communicator 46 is electrically connected to the processor 45. The wireless communicator 46 is configured to wirelessly send a signal. The signal selectively includes a first signal and a second signal. The first signal corresponds to a first app. The second signal corresponds to a second app. Thus, the wireless communicator 46 is configured to wirelessly communicate with the remote communication device ED and the cycle computer CC. More specifically, the wireless communicator 46 is configured to both send and receive wireless signals to the remote communication device ED and the cycle computer CC. Thus, for example, the wireless communicator 46 can be a wireless transceiver. The wireless communication signals can be radio frequency (RF) signals, ultra-wide band communication signals, radio frequency identification (RFID), ANT+ communications, Bluetooth® communications, BLE communications or any other type of signal suitable for short range wireless communications as understood in the bicycle field. Preferably, the wireless communicator 46 is configured to wirelessly communicate with the remote communication device ED and the cycle computer CC using a BLE communication protocol. As explained below, the program instructions are executable by the processor 45A of the bicycle component BC. The processor 45A is electrically connected to the wireless communicator 46 of the bicycle component BC. As explained below, the program instructions are configured to: cause the wireless communicator 62 to wirelessly send a first signal corresponding to a first app; and cause the wireless communicator 62 to wirelessly send a second signal corresponding to a second app in response to receipt of an instruction from the remote communication device ED.

Figure 5:
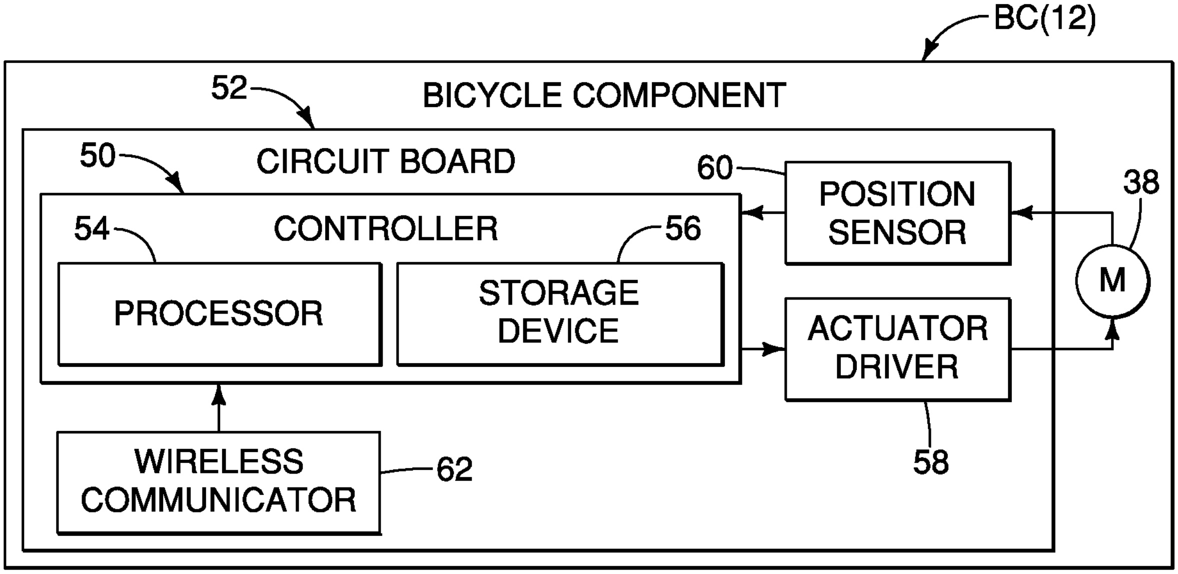
FIG. 5 is a schematic block diagram of the rear derailleur in accordance with illustrated embodiments of the present disclosure.

Referring now to FIGS. 4 to 6, the rear derailleur 12 is configured to wirelessly communicate with the remote communication device ED (FIG. 6), which includes the first app and the second app. In particular, the rear derailleur 12 further comprises a controller 50 that is configured to operate the actuator 38 in response to receiving a shift command. In other words, the controller 50 operates the actuator 38 to move the linkage structure 34 and the chain guide 36 in the lateral direction of the bicycle B in response to receiving a shift command from the operating device 14. Here, for example, the controller 50 is provided on a circuit board 52. In the illustrated embodiment, the circuit board 52 is disposed in the housing of the actuator 38. The controller 50 is an electronic controller that includes one or more processors 54 that executes a predetermined derailleur control program for operating the actuator 38. The processor 54 of the controller 50 includes, for example, a central processing unit (CPU) or a micro processing unit (MPU). The controller 50 can include one or more microcomputers.

The rear derailleur 12 further comprises a storage device 56. Here, the storage device 56 is provided on the circuit board 52 of the controller 50. Alternatively, or in addition, the storage device 56 can be provided separate from the controller 50. The storage device 56 stores a control program and information used for a motor control process for performing a shifting operation. The storage device 56 includes any computer storage device or any non-transitory computer-readable medium with the sole exception of a transitory, propagating signal. For example, the storage device 56 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM). Thus, the storage device 56 includes a non-transitory computer-readable storage medium that is provided for storing program instructions thereon. In particular, the storage device 56 has stored a wireless communication program for wirelessly communicating with the remote communication device ED and the cycle computer CC. The storage device 56 has stored a data providing program for providing data to the remote communication device ED and the cycle computer CC. The storage device 56 has stored a pairing program for pairing with the remote communication device ED and the cycle computer CC. The storage device 56 also has stored various identification information of the rear derailleur 12.

Preferably, the controller 50 further includes an actuator (motor) driver 58 for driving the actuator 38. The actuator driver 58 is electrically connected to the controller 50. The actuator driver 58 drives the actuator 38 in accordance with a control signal from the controller 50. Preferably, the controller 50 and the actuator driver 58 are provided in the housing of the actuator 38. For example, the controller 50 and the actuator driver 58 can be provided on the same circuit board or separate circuit boards. Here, the actuator driver 58 is a drive circuit that is provided on the circuit board 52. The actuator driver 58 includes an inverter circuit.

Still referring to FIG. 4, the rear derailleur 12 further comprises a position sensor 60 that is configured to detect a movement of the actuator 38. The position sensor 60 includes at least one of a potentiometer, a photo interrupter, a rotation sensor, and a rotary encoder. Here, for example, the position sensor 60 is an encoder that is configured to detect a movement of at least part of a gear reduction unit of the actuator 38. In particular, the position sensor 60 is configured to sense a state of a magnetic field or change in magnetic field. The controller 50 is configured to calculate a rotational angle of one of the gears of the gear reduction unit based on the change in the magnetic field sensed by the position sensor 60. Here, the position sensor 60 is provided on the circuit board 52. A magnet is fixed to a part of the gear reduction unit of the actuator 38. Thus, if the gear reduction unit rotates in accordance with the operation of the actuator 38, then the position sensor 60 can sense a change in a state of the gear reduction unit of the actuator 38.

Basically, the controller 50 is configured to monitor a detected value of the position sensor 60. The controller 50 determines a current gear position of the rear derailleur 12 based on the detected value of the position sensor 60 with respect to a predetermined value that is stored in storage device 56. In this way, the controller 50 can determine the current gear position of the rear derailleur 12 based on the detected value of the position sensor 60.

As seen in FIG. 5, the rear derailleur 12 further comprises a wireless communicator 62 that is configured to wirelessly communicate with the operating device 14 and the cycle computer CC and the remote communication device ED. More specifically, the wireless communicator 62 is configured to both send and receive wireless signals to the cycle computer CC and the remote communication device ED. In particular, the wireless communicator 62 is electrically connected to the processor 54. The wireless communicator 62 is configured to wirelessly send a signal. The signal selectively includes a first signal and a second signal. The first signal corresponds to a first app. The second signal corresponds to a second app.

Also, the wireless communicator 62 receive wireless signals from the operating device 14. Thus, for example, the wireless communicator 62 can be a wireless transceiver. The wireless communication signals can be radio frequency (RF) signals, ultra-wide band communication signals, radio frequency identification (RFID), ANT+ communications, Bluetooth® communications BLE communications, or any other type of signal suitable for short range wireless communications as understood in the bicycle field. Preferably, the wireless communicator 62 is configured to wirelessly communicate with the remote communication device ED and the cycle computer CC using a BLE communication protocol. The program instructions are executable by the processor 54 of the bicycle component BC. The processor 54 is electrically connected to the wireless communicator 62 of the bicycle component BC. The program instructions are configured to: cause the wireless communicator 62 to wirelessly send a first signal corresponding to a first app; and cause a wireless communicator 62 to wirelessly send a second signal corresponding to a second app in response to receipt of an instruction from the remote communication device ED.

Thus, the rear derailleur 12 is an example of a bicycle component BC comprising a processor 54 and a wireless communicator 62. Also, the rear derailleur 12 is an example of the bicycle component BC further comprising a storage device 56. The storage device 56 is configured to store a pairing information related to pairing with the remote communication device ED.

Referring now to FIG. 6, the remote communication device ED is schematically illustrated. The remote communication device ED is configured to wirelessly communicate with the bicycle component BC (e.g., the rear derailleur 12 and the crank 22). The remote communication device ED is preferably a smartphone. Alternatively, the remote communication device ED can be any portable device that can wirelessly communicate with the bicycle components. In particular, the remote communication device ED comprises a processor 70, a storage device 72 and a remote communication wireless communicator 73. The storage device 72 includes a non-transitory computer-readable storage medium that is provided for storing remote program instructions thereon. The program instructions are executable by a remote processor 70 of the remote communication device ED. The remote processor 70 is electrically connected to a remote wireless communicator 62 of the remote communication device ED. The remote wireless communicator 73 is configured to wirelessly communicate with the wireless communicator 46, 62 of the bicycle component BC. The wireless communicator 46, 62 is configured to wirelessly send a first signal corresponding to a first app and is configured to wirelessly send a second signal corresponding to a second app. The remote program instructions are configured to: cause the remote wireless communicator 73 to wirelessly send an instruction to the wireless communicator 46, 62. The instruction from the remote wireless communicator 73 is configured to instruct the processor 54 of the bicycle component BC to cause the wireless communicator 46, 62 to send the second signal.

Programs for the first app and the second app are stored in the storage device 72. The storage device 72 also has stored a wireless communication program for wirelessly communicating with the bicycle components BC. The storage device 72 has stored a pairing program for pairing with the bicycle components BC. The storage device 72 also has stored various identification information of the remote communication device ED.

Since remote communication devices such as smartphones are well known, the remote communication device ED will not be discussed in further detail. Here, in the first embodiment, the remote communication device ED includes both the first app and the second app. The first app is preferably a software application that provides the user with selected information related to the bicycle based on a first signal from one or more of the bicycle components BC. The first app can be configured to provide information similar to a cycle computer. The second app is preferably a software application that allows the user to diagnose the bicycle components BC, modify functions of the bicycle components, and/or update software of the bicycle components.

Figure 7:
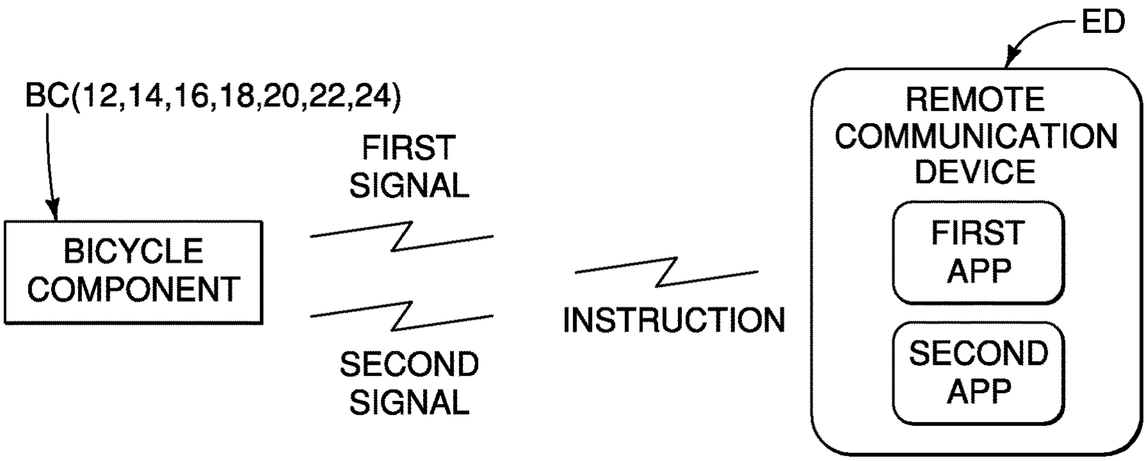
FIG. 7 is a diagrammatic view of the remote communication device wirelessly communicating with one the bicycle component (e.g., the rear derailleur or the power meter) in accordance with a first embodiment.
Figure 8:
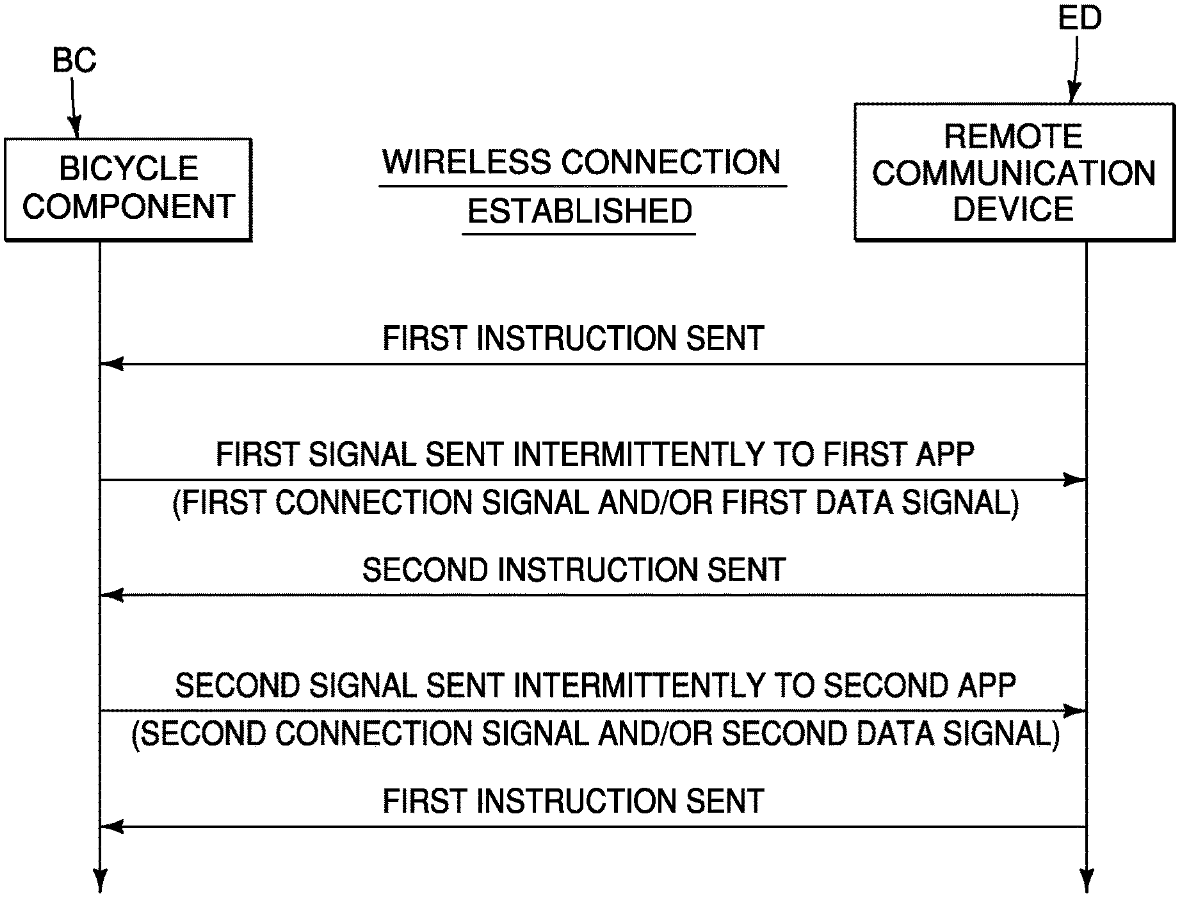
FIG. 8 is a first flow diagram of the wireless communications between the remote communication device and the bicycle component (e.g., the rear derailleur or the power meter) in accordance with the first embodiment.
Figure 9:
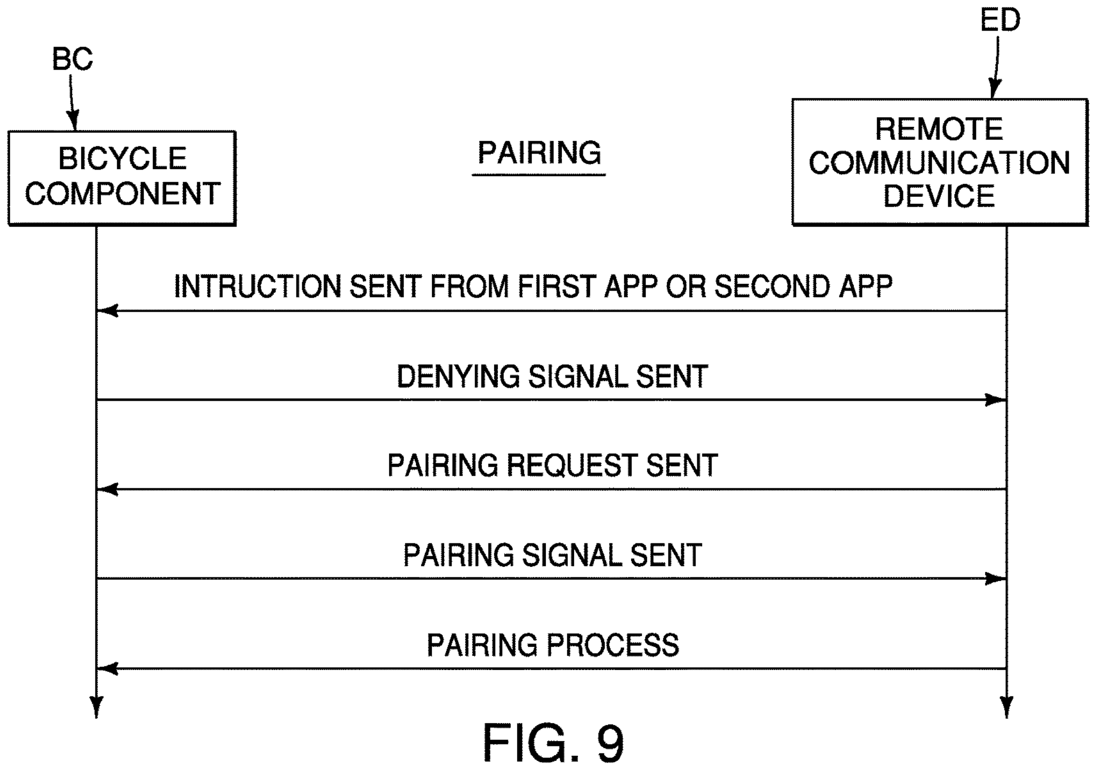
FIG. 9 is a second flow diagram of the wireless communications between the remote communication device and the bicycle component (e.g., the rear derailleur or the power meter) in accordance with the first embodiment.

Turning now to FIGS. 7 to 9, the basic communications between the bicycle components BC and the remote communication device ED will now be discussed in the case of the first embodiment. As seen in FIG. 7, in the first embodiment, at least one of the bicycle components BC wirelessly communicates with the remote communication device ED, which includes both the first app and the second app. In the case of FIG. 8, the bicycle components BC and the remote communication device ED have already stored each other's identification information for communicating using an appropriate communication protocol. Thus, for example, the identification information for the remote communication device ED is prestored in the storage device 45B and the storage device 56 of the bicycle components BC, and the identification information of the bicycle components BC are prestored in the storage device 72 of the remote communication device ED. In other words, the FIG. 8 illustrates communications between at least one bicycle component BC and the remote communication device ED where the at least one bicycle component BC and the remote communication device ED are paired or a wireless connection has been previously established. On the other hand, FIG. 9 illustrates communications between at least one bicycle component BC and the remote communication device ED where the at least one bicycle component BC and the remote communication device ED are not paired or a wireless connection has been not previously established. Thus, FIG. 9 illustrates an example of the communications for pairing the at least one bicycle component BC and the remote communication device ED. Of course, not all communication protocols require a pairing process. In other words, a point-to-point communication link can be established between the at least one bicycle component BC and the remote communication device ED without performing a pairing process.

Referring to FIG. 8, the basic communications occurring between at least one bicycle component BC and the remote communication device ED are illustrated in the case where neither the first app nor the second app is connected to the bicycle component BC. Thus, when the user wants to use either the first app or the second app of the remote communication device ED to communicate with the bicycle component BC, the user inputs a user operation to the remote communication device ED to send an instruction. The instruction for using the first app can also be referred to as a first instruction. Thus, the first instruction instructs the bicycle component BC to start communicating with the first app of the remote communication device ED. The instruction for using the second app can also be referred to as a second instruction. Thus, the second instruction instructs the bicycle component BC to start communicating with the second app of the remote communication device ED.

FIG. 8 illustrates an example of the communications occurring when a user wants to initially use the first app, and then switch from the first app to the second app. Generally, in the first embodiment, the user touches an input 74 on the touch screen of the remote communication device ED to send the first instruction to the bicycle component BC. Alternatively, the user operation can be merely opening the first app, which then automatically generates and sends the first instruction. In either case, the remote communication device ED is configured to generate the instruction in response to receipt of a user operation to the remote communication device ED. Basically, the instruction is sent from the remote communication device ED in a state where the wireless communication is established. In this way, the instruction is sent from the first app of the remote communication device ED to the bicycle component BC. Since the user wants to use the first app, the first instruction is sent to the bicycle component BC. As seen in FIG. 8, the first instruction instructs the bicycle component BC to send the first signal which includes the first connection signal. The first connection signal is received by the first app to start running the first app. The bicycle component BC intermittently sends the first signal to the first app at predetermined intervals. These subsequent transmissions of the first signal includes the first data signal. Then, when the user wants to switch from the first app to the second app, the user touches the input 74 on the touch screen of the remote communication device ED to send the second instruction to the bicycle component BC. In this way, the bicycle component BC is instructed to disconnect from the first app, and send the second signal which includes the second connection signal. The second connection signal is received by the second app to start running the second app. The bicycle component BC intermittently sends the second signal to the second app at predetermined intervals. These subsequent transmissions of the second signal includes the second data signal. The user can switch back to the first app by the user touching the input 74 on the touch screen of the remote communication device ED to send the first instruction to the bicycle component BC.

More specifically, the remote communication device ED is configured to receive the user operation in a state where the wireless connection is established using the input 74. Here, the input 74 is illustrated as a pair of icons 74A and 74B on a touch screen of the remote communication device ED. However, the input 74 is not limited to the icons 74A and 74B on a touch screen. The input 74 can be, for example, a mechanical button or a mechanical switch. Moreover, while the input 74 is illustrated as a pair of buttons or icons 74A and 74B (image on a touch screen), it will be apparent from this disclosure that different inputs can be used depending on the current screen being display on the remote communication device ED. Here, for example, a “disconnection button” 74A and a “switch app button” 74B can be simultaneously displayed on the remote communication device ED as the input 74 while the first app is running and while the second app is running. If the user touches the disconnection button 74A, then the remote communication device ED just disconnects the wireless connection and does not send any instruction.

However, if the user touches the switch app button 74B (i.e., the input 74), then the remote communication device ED disconnects the wireless connection and send an instruction to send either the first signal or the second signal depending on whether the first app or the second is currently running. In this way, a user can easily and quickly switch from the first app to the second app, and switch from the second app to the first app. In FIG. 8, for example, where the first app is running, the user touches the switch app button 74B to send the second instruction to the bicycle component BC for using the second app in connection with the bicycle component BC. In this case, the second instruction instructs the bicycle component BC to disconnect communication with the first app and send the second signal intermittently. Here, at least initial transmission of the second signal includes the second connection signal and at least subsequent transmission of the second signal includes the second data signal. In this way, the second information related to the bicycle B transmitted in the second data signal can be displayed on the remote communication device ED in accordance with second app.

On the other hand, where the second app is running, the user touches the switch app button 74B (i.e., the input 74) to send the first instruction to the bicycle component BC for using the first app in connection with the bicycle component. In this case, the first instruction instructs the bicycle component BC to disconnect communication with the second app and send the first signal intermittently. Here, at least initial transmission of the first signal includes the first connection signal and at least subsequent transmission of the first signal includes the first data signal. In this way, the first information related to the bicycle B transmitted in the first data signal can be displayed on the remote communication device ED in accordance with first app.

Upon the wireless communicator 46, 62 of the bicycle component(s) BC receiving the instruction from the first app, the wireless communicator 46, 62 of the bicycle component(s) BC sends the first signal. As mentioned above, the instruction from the first app can also be referred to as the first instruction. The first instruction instructs the bicycle component BC to start communicating with the first app of the remote communication device ED. In other words, the wireless communicator 46, 62 is configured to send the first signal in response to receipt of the instruction where the user operation is associated with using the first app on the remote communication device ED in connection with the bicycle component BC. The first signal includes a first connection signal for using the first app in connection with the bicycle component BC. In other words, the wireless communicator 46, 62 is configured to establish a wireless connection between the wireless communicator 46, 62 and the remote communication device ED using the first connection signal. In this way, the remote communication device ED is configured to permit the sending of the first instruction in a state where the wireless connection is established. The first connection signal includes identification information of the bicycle component BC. In this way, the wireless communicator 46, 62 is wirelessly connected with the first app of the remote communication device ED. Thus, the wireless communicator 46, 62 is configured to send the first data signal in a state where the wireless connection is established using the first connection signal. Also, the first signal includes a first data signal. The first data signal includes first information related to the bicycle B. The first information is discussed above. Preferably, the first connection signal is no longer sent after the wireless connection has been established. Rather, the first data signal is sent after the wireless connection has been established.

Thus, the type of data signal is changed depending on which signal the wireless connection was established with. In particular, if the first connection signal is used for the wireless connection, the first data signal is sent by the bicycle component BC. On the other hand, if the second connection signal is used for the wireless connection, the second data signal is sent by the bicycle component BC.

When the user wishes to switch from the first app of the remote communication device ED to the second app of the remote communication device ED, the user inputs a user operation to the remote communication device ED. For example, the remote communication device ED has the input 74 for a user to input a user operation to the remote communication device ED. Preferably, the input 74 is accessible to the user without first switching from the first app to the second app. In other words, when the user press on the input 74, the remote communication device ED will automatically disconnect the first app from the bicycle component BC and open the second app. Alternatively, the user operation can be closing the first app and opening the second app. In such a case, the closing of the first app disconnects the first app from the bicycle component BC and opening the second app starts the communication process for the bicycle component(s) BC to communicate with the second app.

Thus, upon the user inputting the user operation to use the second app, the remote communication device ED is configured to generate the instruction in response to receipt of the user operation to the remote communication device ED. In other words, in this instance, the instruction generated from the remote communication device ED can be referred to as a second instruction. The second instruction instructs the bicycle component BC to start communicating with the second app of the remote communication device ED. Basically, the second instruction is sent from the remote communication device ED in a state where the wireless communication is established. In this way, the second instruction is sent from the second app of the remote communication device ED to the bicycle component(s). Upon the wireless communicator 46, 62 of the bicycle component(s) BC receiving the second instruction from the second app, the wireless communicator 46, 62 of the bicycle component(s) BC sends the second signal. In other words, the wireless communicator 46, 62 is configured to change the signal from the first signal to the second signal in response to receipt of the instruction in a state where the wireless communicator 46, 62 has established the wireless connection with the remote communication device ED using the first connection signal. In particular, the second signal includes a second connection signal for using the second app in connection with the bicycle component BC. The wireless communicator 46, 62 is configured to establish the wireless connection using the second connection signal. Thus, the wireless communicator 46, 62 is wirelessly connected with the remote communication device ED using the second connection signal. In particular, the second connection signal includes identification information of the bicycle component BC. In this way, the wireless communicator 46, 62 is wirelessly connected with the second app of the remote communication device ED. Preferably, the second connection signal is no longer sent after the wireless connection has been established. Rather, the second data signal is sent after the wireless connection has been established.

Preferably, the wireless communicator 46, 62 is configured to disconnect from the remote communication device ED prior to connecting with the remote communication device ED using the second connection signal in a state where the wireless communicator 46, 62 has established the wireless connection with the remote communication device ED using the first connection signal. The second signal also includes a second data signal. The wireless communicator 46, 62 is configured to send the second data signal in a state where the wireless connection is established using the second connection signal. The second data signal includes second information related to the bicycle B. as discussed above.

Of course, a user can first start communicating with the bicycle component(s) BC with the second app of the remote communication device ED. Thus, when the user wants to use the second app of the remote communication device ED to communicate with one or more of the bicycle components BC, the user opens the second app and inputs a user operation to the remote communication device ED using the input 74. Alternatively, the user operation can be opening the second app. In either case, the remote communication device ED is configured to generate the instruction in response to receipt of a user operation to the remote communication device ED. Basically, the instruction is sent from the remote communication device ED in a state where the wireless communication is established. Then, the wireless communicator 46, 62 is configured to send the second signal in response to receipt of the instruction where the user operation is associated with using the second app in connection with the bicycle component BC. In other words, the wireless communicator 46, 62 is configured to send the second signal in response to receipt of an instruction from the remote communication device ED. In particular, the second signal includes a second connection signal for using the second app in connection with the bicycle component BC. The wireless communicator 46, 62 is configured to establish the wireless connection using the second connection signal.

Referring now to FIG. 9, an optional wireless communication sequence is illustrated where a pairing process is needed and/or desired. In other words, a point-to-point communication link can be established between the at least one bicycle component BC and the remote communication device ED without performing a pairing process. Thus, the wireless communication sequence of FIG. 8 can be performed without using performing a pairing process. Thus, optionally, pairing process can be performed in the case where the remote communication device ED has not been paired with the bicycle component BC. FIG. 9 illustrates an example of a communication sequence for performing a pairing process to establish wireless communication between the remote communication device ED and the bicycle component BC. For example, when the remote communication device ED sends an instruction (a wireless signal) to the bicycle component BC that has not been paired, the wireless communicator 46, 62 does not recognize the remote communication device ED, and responds by sending a denying signal. In other words, if the instruction signal is not recognized by the bicycle component BC, then a denying signal is sent from the bicycle component BC to the remote communication device ED indicating the instruction has been rejected. In this case, upon receiving the denying signal from the bicycle component BC, the remote communication device ED starts a pairing process by sending a pairing request (i.e., a wireless signal) to the bicycle component BC. Upon receiving the pairing request from the remote communication device ED, the processor 45A, 54 instructs the wireless communicator 46, 62 to send a pairing signal to the remote communication device ED. After this exchange, the bicycle component BC and the remote communication device ED select a key generation method to be used in the pairing process. Once the key generation method has been selected, an encrypted connection is established wherein keys are distributed between the bicycle component BC and the remote communication device ED. In this way, the processor 45A, 54 is configured to conduct a pairing process with the remote communication device ED in response to receipt of the instruction in a case where the storage device 45B, 56 does not store the pairing information. This pairing process is performed by the user only pressing the input 74 of the remote communication device ED. Thus, the pairing process can be performed during riding (e.g., pedaling) of the bicycle B, and does not use a pairing button or other manual input on the bicycle component BC. Since the pairing process is well known, the pairing process will not be described in further detail herein.

Figure 10:
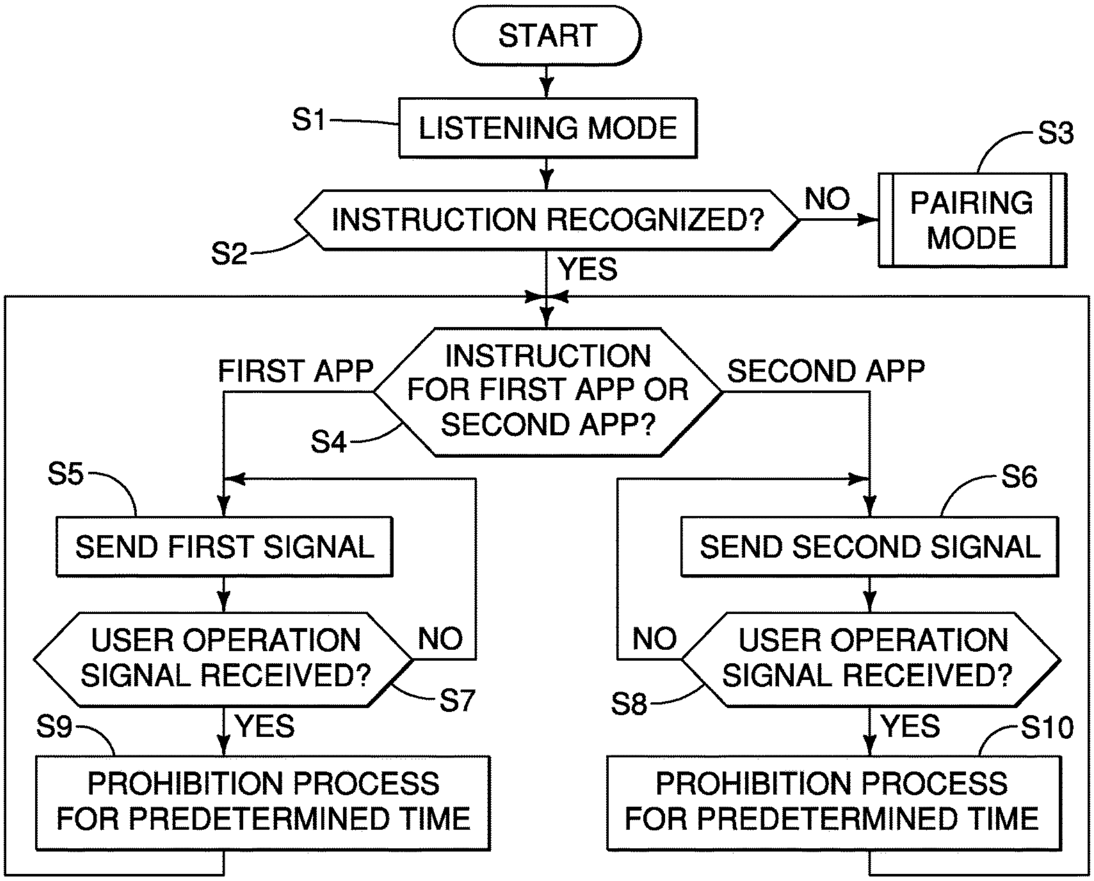
FIG. 10 is a flow chart of the wireless communications between the remote communication device and the bicycle component (e.g., the rear derailleur or the power meter) in accordance with the first embodiment.

Referring now to FIG. 10, a flow chart illustrates the control process executed by the processor 45A, 54 of the bicycle component BC for communicating with the first app and the second app of the remote communication device ED. When power is provided to the bicycle component BC, the control process begins.

In step S1, the bicycle component BC enters a listening mode for receiving wireless signals. Upon receiving a wireless signal, the process proceeds to step S2.

In step S2, the processor 45A, 54 determines if an instruction (i.e., a wireless signal) is recognized. If the identification information for conduction wireless communications is not pre stored in the storage device 45B, 56, then the process proceeds step S3. However, if the identification information is recognized, then the process proceeds step S4.

In step S3, the processor 45A, 54 enters a pairing mode where the processor 45A, 54 executes a pairing process, which is discussed above. After completing the pairing process, the process proceeds step S4.

In step S4, the processor 45A, 54 determines whether the instruction is from the first app or the second app. If the instruction is from the first app, then the process proceeds step S5. If the instruction is from the second app, then the process proceeds step S6.

In step S5, the processor 45A, 54 instructs the wireless communicator 46, 62 to send the first signal, which includes the first connection signal and the first data signal. After sending the first signal, the process proceeds step S7, where the processor 45A, 54 determines whether a disconnection signal has been received.

In step S6, the processor 45A, 54 instructs the wireless communicator 46, 62 to send the second signal, which includes the second connection signal and the second data signal. After sending the second signal, the process proceeds step S8, where the processor 45A, 54 determines whether a disconnection signal has been received.

In step S7, if the processor 45A, 54 determines whether a user operation signal has been received in which the first app is either to be disconnected from the bicycle component BC or to be switched to the second app, then the process proceeds to step S9. Otherwise, the process proceeds back to step S5.

In step S8, if the processor 45A, 54 determines whether a user operation signal has been received in which the first app is either to be disconnected from the bicycle component BC or to be switched to the second app. Otherwise, the process proceeds back to step S6.

In step S9, the processor 45A, 54 is configured to execute a prohibition process prohibiting reconnection with the remote communication device ED for a predetermined time after disconnecting from the remote communication device ED. The predetermined time is, for example, fifteen seconds. However, the user can override the prohibition process if the user wants to connect the bicycle component BC to a different device from the remote communication device ED. In particular, the processor 45A, 54 is configured not to execute the prohibition process in a case where the processor 54 receives the instruction from the remote communication device ED. Thus, in the case where the user wants to connect the bicycle component BC to a different device from the remote communication device ED, the user can send an instruction from the remote communication device ED to connect to the different device. Alternatively, the prohibition process of step S9 can be omitted. Also, in the first embodiment, since the first app and the second app are both installed the same remote communication device ED, the prohibiting process can be stopped in a case where the user switch between the first app and the second app in the same remote communication device ED. For switching between the first app and the second app, the bicycle component BC only needs to be disconnected from the remote communication device ED once and then can be connected to the remote communication device ED again.

In step S10, the processor 45A, 54 is configured to execute a prohibition process prohibiting reconnection with the remote communication device ED for a predetermined time after disconnecting from the remote communication device ED. The predetermined time is, for example, fifteen seconds. However, again similar to step S9, the user can override the prohibition process if the user wants to connect the bicycle component BC to a different device from the remote communication device ED. In particular, the processor 45A, 54 is configured not to execute the prohibition process in a case where the processor 54 receives the instruction from the remote communication device ED. Alternatively, the prohibition process of step S10 can be omitted similar to step S9.

Referring now to FIGS. 11 to 14, the system 10 has been configured in accordance with a second embodiment. Here, the second embodiment, the remote communication device ED and the bicycle components BC are the same as in the first embodiment, except that the remote communication device ED only includes the second app and the first app is installed on the cycle computer CC. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 11:
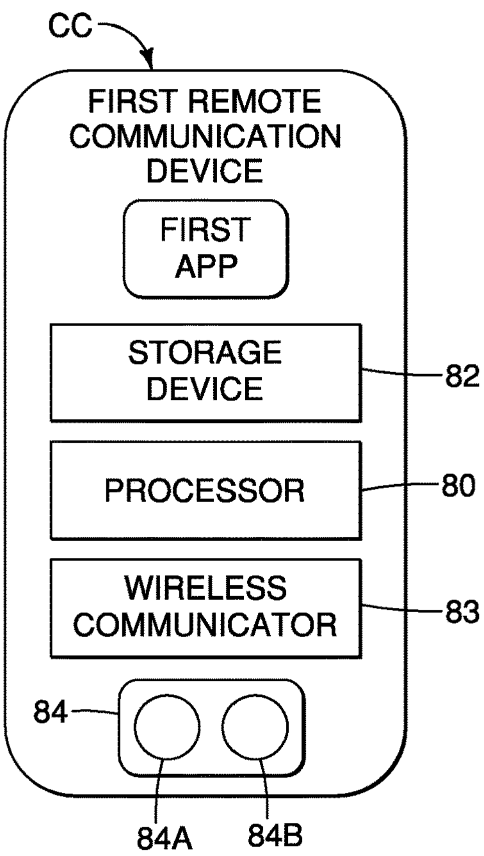
FIG. 11 is a schematic block diagram of a first remote communication device configured to wirelessly communicate with one or more of the bicycle components (e.g., the rear derailleur and/or the power meter) of the bicycle illustrated in FIG. 1 in accordance with a second embodiment.

Here, as seen in FIG. 11, the cycle computer CC is schematically illustrated. the cycle computer CC includes the first app. The cycle computer CC is configured to wirelessly communicate with the bicycle component BC (e.g., the rear derailleur 12 and the crank 22). In particular, the cycle computer CC comprises a remote processor 80, a remote storage device 82 and a remote wireless communicator 83. The remote storage device 82 includes a non-transitory computer-readable storage medium that is provided for storing remote program instructions thereon. A program for the first app is stored in the external storage device 82. The remote storage device 82 also has stored a wireless communication program for wirelessly communicating with the bicycle components BC. The remote storage device 82 has stored a pairing program for pairing with the bicycle components BC. The remote storage device 82 also has stored various identification information of the cycle computer CC.

The remote program instructions for the first app are executable by the remote processor 80 of the cycle computer CC. The remote processor 80 is electrically connected to the remote wireless communicator 83 of the cycle computer CC. The remote wireless communicator 83 is configured to wirelessly communicate with the wireless communicator 46, 62 of the bicycle component BC. The wireless communicator 83 is configured to wirelessly send a first instruction corresponding to a first app to the wireless communicator 46, 62 of the bicycle component BC. In particular, the remote processor 80 is configured to execute the remote program instructions to cause the remote wireless communicator 83 to wirelessly send the first instruction to the wireless communicator 46, 62 of the bicycle component BC. The first instruction from the remote wireless communicator 83 is configured to instruct the processor 45A, 54 of the bicycle component BC to cause the wireless communicator 46, 62 to send the first signal (the first connection signal and the first data signal) to the cycle computer CC (i.e., the first remote communication device).

Figure 12:
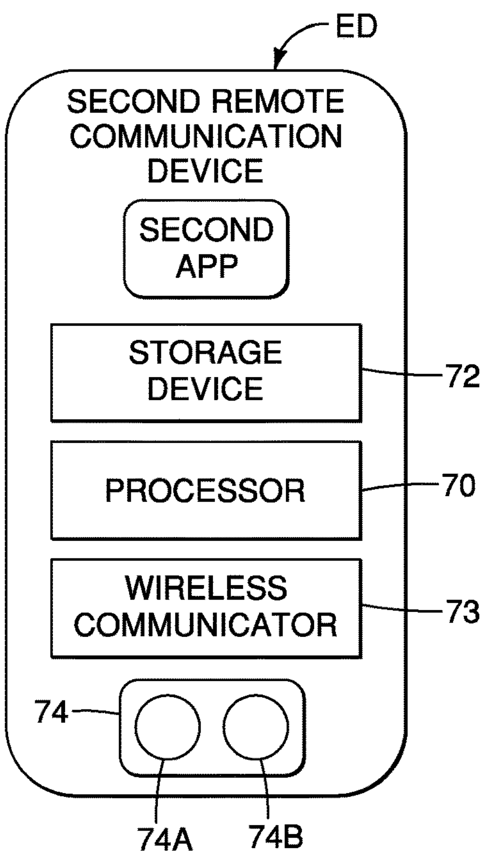
FIG. 12 is a schematic block diagram of a second remote communication device configured to wirelessly communicate with one or more of the bicycle components (e.g., the rear derailleur and/or the power meter) of the bicycle illustrated in FIG. 1 in accordance with the second embodiment.
Figure 13:
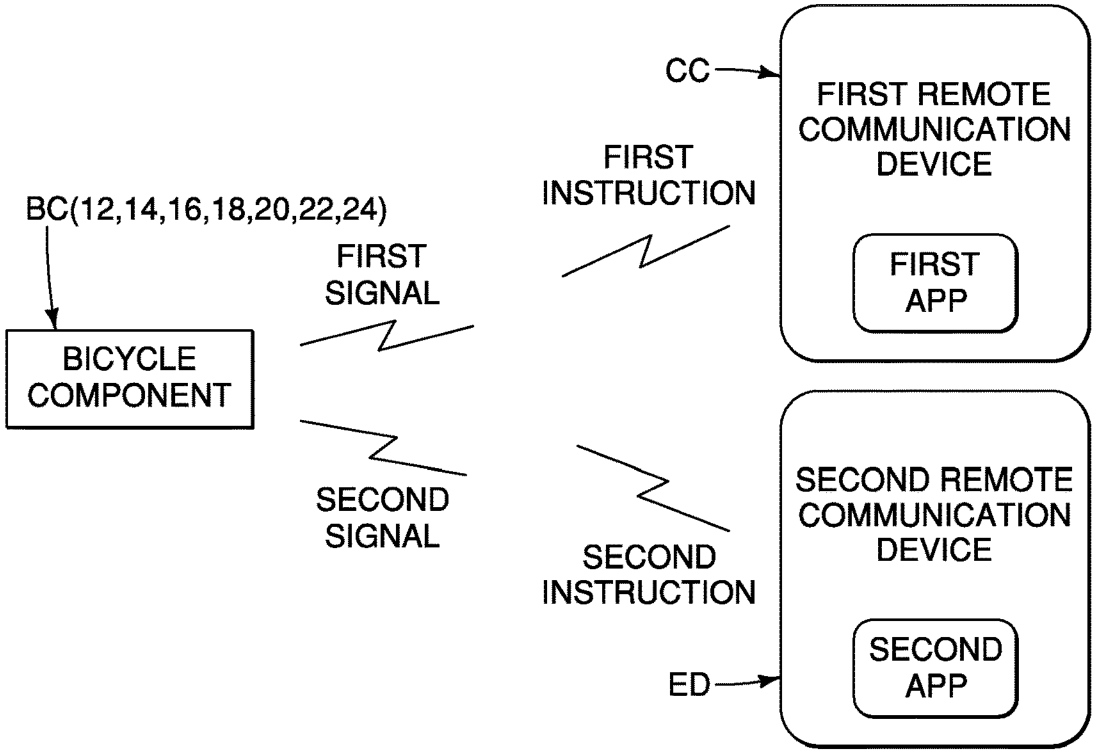
FIG. 13 is a diagrammatic view of the first remote communication device and the second remote communication device wirelessly communicating with one the bicycle component (e.g., the rear derailleur or the power meter) in accordance with the second embodiment.

As seen in FIG. 12, the remote communication device ED (i.e., the second remote communication device) is schematically illustrated in accordance with the second embodiment. Here, the remote communication device ED includes the second app. Thus, the remote communication device ED of the second embodiment is the same as the first embodiment, except that the first app is not installed on the remote communication device ED. The remote communication device ED is configured to wirelessly communicate with the bicycle component BC (e.g., the rear derailleur 12 and the crank 22). In particular, the remote communication device ED of the second embodiment includes the processor 70, the storage device 72 and the remote wireless communicator 73, which are discussed above. The remote wireless communicator 73 is configured to wirelessly communicate with the wireless communicator 46, 62 of the bicycle component BC. The remote communication wireless communicator 73 is configured to wirelessly send a second instruction corresponding to a second app to the wireless communicator 46, 62 of the bicycle component BC. In particular, the external processor 70 is configured to execute the remote program instructions to cause the remote wireless communicator 73 to wirelessly send the second instruction to the wireless communicator 46, 62 of the bicycle component BC. The second instruction from the remote wireless communicator 73 is configured to instruct the processor 45A, 54 of the bicycle component BC to cause the wireless communicator 46, 62 to send the second signal (the second connection signal and the second data signal) to the remote communication device ED (i.e., the second remote communication device).

Here, the cycle computer CC (i.e., the first remote communication device) includes an input 84 for the user to disconnect the first app, and switch from the first app to the second app. For example, the input 84 includes a pair of icons 74A and 74B on a touch screen of the cycle computer CC. However, the input 74 is not limited to the icons 74A and 74B on a touch screen. The input 74 can be, for example, a mechanical button or a mechanical switch. Moreover, while the input 74 is illustrated as a pair of buttons or icons 74A and 74B (image on a touch screen), it will be apparent from this disclosure that different inputs can be used depending on the current screen being display on the cycle computer CC. Here, for example, a “disconnection button” 84A is displayed on the cycle computer CC for disconnecting the first app, and a “switch app button” 84B is also simultaneously displayed on the cycle computer CC for switching to the second app. If the user touches the disconnection button 84A, then the cycle computer CC just disconnects the wireless connection and does not send any instruction. If the user touches the switch app button 84B, then the cycle computer CC sends the first instruction to the bicycle component BC to disconnect from the first app and send the second signal for communicating with the second app of the remote communication device ED.

In the second embodiment, during riding, the bicycle component BC is connected to the cycle computer CC (i.e., the first remote communication device) such that the first app displays real time data related to the bicycle. In particular, the bicycle component BC intermittently transmits a wireless signal (i.e., the first signal) to the cycle computer CC. While data is being transmitted from the bicycle component BC to the cycle computer CC, the input 84 is accessible to the user. As mentioned above, here, the input 84 includes an icon representing the disconnection button 84A and icon representing the switch app button 84B. In the case where the input 84 is an image or icon displayed on the touch screen of the cycle computer CC, the input 84 is active and can receive a user operation. When the data is not being transmitted from the bicycle component BC to the cycle computer CC, the input 84 is displayed on the touch screen of the cycle computer CC as inactive. Thus, the input 84 can alternately switch between active and inactive during riding based on whether or not the first app is connected to the bicycle component BC.

If the user wants to use the second app of the remote communication device (e.g., the user wants to change a setting of the bicycle component BC) while using the first app, the user touches the switch app button 84B of the input 84 to send a wireless signal from the cycle computer CC to the bicycle component BC. Upon receiving the wireless signal from the cycle computer CC, the bicycle component BC disconnects the communication with the cycle computer CC automatically sends the second signal (the second connection signal and the second data signal) to the remote communication device ED (i.e., the second remote communication device). In other words, the bicycle component BC stops the intermittent transmission of the first signal from the bicycle component BC to the cycle computer CC. After stopping the communication with the cycle computer CC, the bicycle component BC outputs the second signal with the second connection signal to the remote communication device ED to establish communication between the bicycle component BC and the remote communication device ED. Now, the user can start using the second app on the remote communication device ED.

Figure 14:
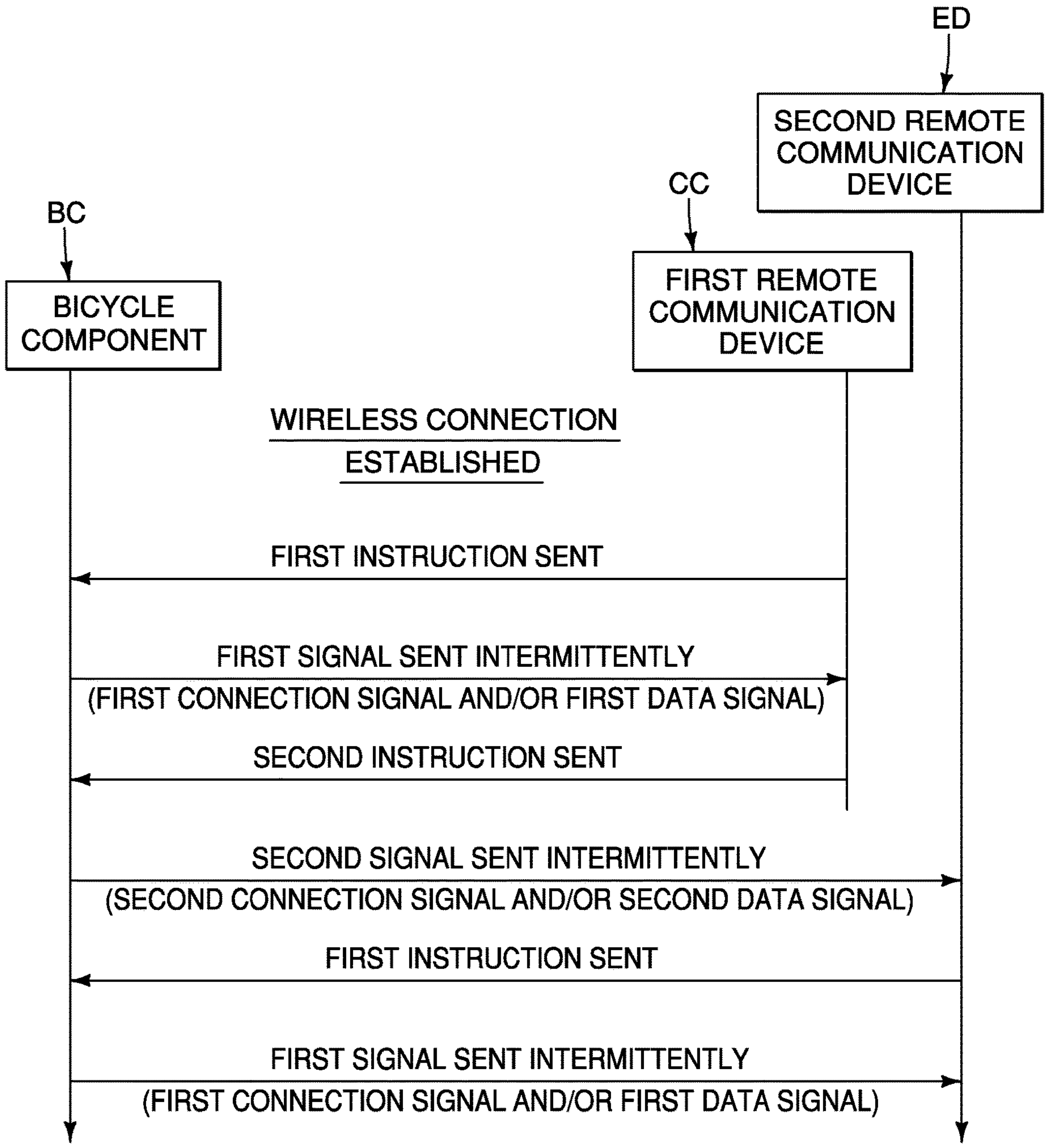
FIG. 14 is a flow diagram of the wireless communications between the remote communication devices and the bicycle component (e.g., the rear derailleur or the power meter) in accordance with the second embodiment.

FIG. 14 illustrates an example of the communications occurring when a user wants to initially use the first app, and then switch from the first app to the second app and back to the first app. Generally, in the second embodiment, the user touches the input 84 on the touch screen of the cycle computer CC (i.e., the first remote communication device) to send the first instruction to the bicycle component BC. In other words, the cycle computer CC is configured to generate the first instruction in response to receipt of a user operation to the cycle computer CC. Basically, the first instruction is sent from the first app of the cycle computer CC to the bicycle component BC. As seen in FIG. 14, the first instruction instructs the bicycle component BC to send the first signal which includes the first connection signal. The first connection signal is received by the first app to start running the first app. The bicycle component BC intermittently sends the first signal to the first app at predetermined intervals. These subsequent transmissions of the first signal includes the first data signal. Then, when the user wants to switch from the first app to the second app, the user touches the switch app button 84B of the input 84 on the touch screen of the cycle computer CC to send the second instruction to the bicycle component BC. In this way, the bicycle component BC is instructed to disconnect from the first app, and send the second signal which includes the second connection signal to the remote communication device ED. The second connection signal is received by the second app of the remote communication device ED to start running the second app. The bicycle component BC intermittently sends the second signal to the second app at predetermined intervals. These subsequent transmissions of the second signal includes the second data signal. The user can switch back to the first app by the user touching the switch app button 74B of the input 74 on the touch screen of the remote communication device ED to send the first instruction to the bicycle component BC. Again, the first instruction instructs the bicycle component BC to intermittently send the first signal to start the first app of the cycle computer CC at predetermined intervals.

While the instruction (i.e., a wireless signal) is sent from either the remote communication device ED or the cycle computer CC in the illustrated embodiments, it will be apparent that the instruction (i.e., a wireless signal) can be sent to the bicycle component BC by another remote communication device that neither include the first app nor the second app in accordance with one modification.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component. Accordingly, these directional terms, as utilized to describe the bicycle component should be interpreted relative to a bicycle in an upright riding position on a horizontal surface and that is equipped with the bicycle component. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component comprising:

a processor; and a wireless communicator electrically connected to the processor, the wireless communicator being configured to wirelessly send a signal, the signal selectively including a first signal and a second signal, the first signal being transmitted to a first app, the second signal being transmitted to a second app, the first app being different from the second app, the wireless communicator being configured to send the second signal in response to receipt of an instruction from a remote communication device, the instruction being generated by an operation of the remote communication device associated with using the first app.

2. The bicycle component according to claim 1, wherein the first app is installed in the remote communication device, the first signal includes a first connection signal for using the first app in connection with the bicycle component, and the wireless communicator is configured to establish a wireless connection between the wireless communicator and the remote communication device using the first connection signal.

3. The bicycle component according to claim 2, wherein the first connection signal includes identification information of the bicycle component.

4. The bicycle component according to claim 2, wherein the instruction is sent from the remote communication device in a state where the wireless communication is established.

5. The bicycle component according to claim 2, wherein the first signal includes a first data signal, the wireless communicator is configured to send the first data signal in a state where the wireless connection is established using the first connection signal, and the first data signal includes first information related to a bicycle.

6. The bicycle component according to claim 2, further comprising:

a storage device configured to store a pairing information related to pairing with the remote communication device, the processor being configured to conduct a pairing process with the remote communication device in response to receipt of the instruction in a case where the pairing information is not stored in the storage device.

7. The bicycle component according to claim 2, wherein the processor is configured to execute a prohibition process prohibiting reconnection with the remote communication device for a predetermined time after disconnecting from the remote communication device.

8. The bicycle component according to claim 7, wherein the processor is configured not to execute the prohibition process in a case where the processor receives the instruction from the remote communication device.

9. The bicycle component according to claim 2, wherein the second app is installed in the remote communication device, the second signal includes a second connection signal for using the second app in connection with the bicycle component, the wireless communicator is configured to establish the wireless connection using the second connection signal, and the wireless communicator is configured to disconnect from the remote communication device prior to connecting with the remote communication device using the second connection signal in a state where the wireless communicator has established the wireless connection with the remote communication device using the first connection signal.

10. The bicycle component according to claim 9, wherein the second signal includes a second data signal, the wireless communicator is configured to send the second data signal in a state where the wireless connection is established using the second connection signal, and the second data signal includes second information related to a bicycle.

11. The bicycle component according to claim 1, wherein the second app is installed in the remote communication device, the second signal includes a second connection signal for using the second app in connection with the bicycle component, and the wireless communicator is wirelessly connected with the remote communication device using the second connection signal.

12. The bicycle component according to claim 11, wherein the second connection signal includes identification information of the bicycle component.

13. The bicycle component according to claim 1, wherein the remote communication device is configured to generate the instruction in response to receipt of a user operation to the remote communication device.

14. The bicycle component according to claim 1, wherein the wireless communicator is configured to send the first signal in response to receipt of the instruction where the user operation is associated with using the first app on the remote communication device in connection with the bicycle component, and the wireless communicator is configured to send the second signal in response to receipt of the instruction where the user operation is associated with using the second app in connection with the bicycle component.

15. The bicycle component according to claim 1, wherein the wireless communicator is configured to change the signal from the first signal to the second signal in response to receipt of the instruction in a state where the wireless communicator has established the wireless connection with the remote communication device using the first connection signal.

16. The bicycle component according to claim 1, wherein the bicycle component includes a transmission device.

17. The bicycle component according to claim 1, wherein the bicycle component includes a sensor.

18. A system comprising the bicycle component according to claim 1, and further comprising:

the remote communication device including the first app and the second app.

19. A non-transitory computer-readable storage medium storing program instructions thereon, the program instructions being executable by a processor of a bicycle component, the processor being electrically connected to a wireless communicator of the bicycle component, the program instructions being configured to:

cause the wireless communicator to wirelessly send a first signal to a first app; and cause a wireless communicator to wirelessly send a second signal to a second app in response to receipt of an instruction from a remote communication device associated with using the first app, the first app being different from the second app, the instruction being generated by an operation of the remote communication device associated with using the first app.

20. A non-transitory computer-readable storage medium storing remote program instructions thereon, the remote program instructions being executable by an remote processor of a remote communication device, the remote processor being electrically connected to a remote wireless communicator of the remote communication device, the remote wireless communicator being configured to wirelessly communicate with a wireless communicator of a bicycle component, the wireless communicator being configured to wirelessly send a first signal to a first app and being configured to wirelessly send a second signal to a second app, the first app being different from the second app, the remote program instructions being configured to:

cause the remote wireless communicator to wirelessly send an instruction to the wireless communicator, the instruction being generated by an operation of the remote communication device associated with using the first app, the instruction from the remote wireless communicator being configured to instruct a processor of the bicycle component to cause the wireless communicator to send the second signal.

* * * * *